(12) United States Patent
Koller et al.

(10) Patent No.: US 9,783,361 B2
(45) Date of Patent: Oct. 10, 2017

(54) STRETCHABLE BEVERAGE CARTRIDGES AND METHODS

(71) Applicant: Starbucks Corporation, Seattle, WA (US)

(72) Inventors: Izaak Koller, Seattle, WA (US); Amanda Juris, Seattle, WA (US); Kathleen L. Ireland, Mercer Island, WA (US); Jeffrey Jack Fleming, Normandy Park, WA (US); Farid Sadeghi, Kirkland, WA (US); Philipe Roget Manoux, Oakland, CA (US); Adam Mekeel Mack, Menlo Park, CA (US); Kurt Philip Dammermann, San Francisco, CA (US); Alan Scott Crarer, Santa Cruz, CA (US)

(73) Assignee: Starbucks Corporation, Seattle, WA (US)

(*) Notice: Subject to any disclaimer, the term of this patent is extended or adjusted under 35 U.S.C. 154(b) by 669 days.

(21) Appl. No.: 14/191,225

(22) Filed: Feb. 26, 2014

(65) Prior Publication Data

US 2014/0272018 A1    Sep. 18, 2014

Related U.S. Application Data

(60) Provisional application No. 61/786,072, filed on Mar. 14, 2013.

(51) Int. Cl.
*B65D 85/804* (2006.01)
*B65D 65/46* (2006.01)

(52) U.S. Cl.
CPC ....... *B65D 85/8043* (2013.01); *B65D 65/466* (2013.01); *Y02W 90/13* (2015.05); *Y02W 90/14* (2015.05)

(58) Field of Classification Search
CPC .................... B65D 85/8043; B65D 65/46
See application file for complete search history.

(56) References Cited

U.S. PATENT DOCUMENTS

| | | |
|---|---|---|
| 1,345,477 A | 7/1920 | Capelli |
| 2,728,678 A | 12/1955 | Sharp |
| (Continued) | | |

FOREIGN PATENT DOCUMENTS

| | | |
|---|---|---|
| CA | 2119178 A1 | 9/1994 |
| CA | 2330615 A1 | 9/2000 |
| (Continued) | | |

OTHER PUBLICATIONS

Ahlstrom Corporation, "CD50122M Provisional Datasheet," 2011, 1 page.

(Continued)

*Primary Examiner* — Erik Kashnikow
*Assistant Examiner* — Chaim Smith
(74) *Attorney, Agent, or Firm* — Knobbe, Martens, Olson & Bear, LLP

(57) ABSTRACT

Present embodiments generally relate to a single-serve beverage cartridge for use with a single-serve coffee brewer. In some embodiments, the cartridge has a body portion, a first filter element, and a second filter element. The cartridge can include a single serving of coffee or another beverage component or precursor. The cartridge can be formed of a biodegradable and/or compostable material. In some embodiments, at least one of the filters is configured to stretch when pressed by a tamping head, thereby allowing the tamping head to be received in the cartridge to facilitate tamping of the beverage component or precursor.

16 Claims, 18 Drawing Sheets

(56) References Cited

U.S. PATENT DOCUMENTS

| | | |
|---|---|---|
| 3,373,043 A | 3/1968 | Rubinstein |
| 3,446,624 A | 5/1969 | Luedtke |
| 3,652,293 A | 3/1972 | Lombana et al. |
| 3,769,032 A | 10/1973 | Lubsen et al. |
| 3,796,032 A | 3/1974 | Clontz |
| 4,136,202 A | 1/1979 | Favre |
| 4,226,175 A | 10/1980 | Sandor |
| 4,471,689 A | 9/1984 | Piana |
| 4,510,853 A | 4/1985 | Takagi |
| 4,550,024 A | 10/1985 | le Granse |
| 4,555,894 A | 12/1985 | Illy |
| 4,572,719 A | 2/1986 | Theobald |
| 4,852,333 A | 8/1989 | Illy |
| 4,853,234 A | 8/1989 | Bentley et al. |
| 4,860,645 A | 8/1989 | van der Lijn et al. |
| 4,948,018 A | 8/1990 | Tansley et al. |
| 4,995,310 A | 2/1991 | van der Lijn et al. |
| 4,996,066 A | 2/1991 | Love et al. |
| 5,008,013 A | 4/1991 | Favre et al. |
| D320,529 S | 10/1991 | Newman et al. |
| D320,530 S | 10/1991 | Newman et al. |
| 5,082,676 A | 1/1992 | Love et al. |
| 5,083,502 A | 1/1992 | Enomoto |
| 5,325,765 A | 7/1994 | Sylvan et al. |
| 5,472,719 A | 12/1995 | Favre |
| 5,555,790 A | 9/1996 | Ackermann |
| 5,573,841 A * | 11/1996 | Adam .................... D04H 1/425 28/103 |
| 5,637,335 A | 6/1997 | Fond et al. |
| 5,656,311 A | 8/1997 | Fond |
| 5,773,067 A | 6/1998 | Bassereau |
| 5,836,326 A | 11/1998 | Inkster |
| 5,840,189 A | 11/1998 | Sylvan et al. |
| 5,866,185 A | 2/1999 | Burkett |
| 5,897,899 A | 4/1999 | Fond |
| 5,948,455 A | 9/1999 | Schaeffer et al. |
| D452,433 S | 12/2001 | Lazaris |
| D452,434 S | 12/2001 | Sweeney |
| 6,510,783 B1 | 1/2003 | Basile et al. |
| D474,110 S | 5/2003 | Sweeney |
| D474,111 S | 5/2003 | Lazaris |
| 6,589,577 B2 | 7/2003 | Lazaris |
| 6,607,762 B2 | 8/2003 | Lazaris et al. |
| 6,645,537 B2 | 11/2003 | Sweeney et al. |
| 6,658,989 B2 | 12/2003 | Sweeney et al. |
| 6,698,333 B2 | 3/2004 | Halliday et al. |
| 6,740,345 B2 | 5/2004 | Cai |
| 6,777,007 B2 | 8/2004 | Cai |
| 6,849,285 B2 | 2/2005 | Masek et al. |
| D502,362 S | 3/2005 | Lazaris et al. |
| 6,869,627 B2 | 3/2005 | Perkovic et al. |
| D506,926 S | 7/2005 | Halliday et al. |
| 6,948,420 B2 | 9/2005 | Green et al. |
| D513,152 S | 12/2005 | Cahen |
| 7,028,604 B2 | 4/2006 | Cortese |
| 7,069,837 B2 | 7/2006 | Sachtleben |
| D530,626 S | 10/2006 | Tanja |
| D539,643 S | 4/2007 | Abel |
| 7,213,506 B2 | 5/2007 | Halliday et al. |
| 7,219,598 B2 | 5/2007 | Halliday et al. |
| 7,243,598 B2 | 7/2007 | Halliday et al. |
| 7,287,461 B2 | 10/2007 | Halliday et al. |
| 7,308,851 B2 | 12/2007 | Halliday |
| 7,322,277 B2 | 1/2008 | Halliday et al. |
| 7,328,651 B2 | 2/2008 | Halliday et al. |
| 7,340,990 B2 | 3/2008 | Halliday et al. |
| 7,377,089 B2 | 5/2008 | Rapparini |
| 7,412,921 B2 | 8/2008 | Hu et al. |
| 7,418,899 B2 | 9/2008 | Halliday et al. |
| 7,469,628 B2 | 12/2008 | Mandralis et al. |
| 7,533,603 B2 | 5/2009 | Halliday et al. |
| 7,533,604 B2 | 5/2009 | Halliday et al. |
| 7,543,527 B2 | 6/2009 | Schmed |
| 7,552,672 B2 | 6/2009 | Schmed |
| 7,569,243 B2 | 8/2009 | Yoakim et al. |
| 7,578,419 B2 | 8/2009 | Greenwald et al. |
| 7,592,027 B2 | 9/2009 | Halliday et al. |
| 7,594,470 B2 | 9/2009 | Cox, Jr. et al. |
| 7,604,826 B2 | 10/2009 | Denisart et al. |
| 7,624,673 B2 | 12/2009 | Zanetti |
| 7,640,843 B2 | 1/2010 | Halliday et al. |
| 7,651,015 B2 | 1/2010 | Girard et al. |
| 7,658,141 B2 | 2/2010 | Masek et al. |
| 7,673,558 B2 | 3/2010 | Panesar et al. |
| 7,681,492 B2 | 3/2010 | Suggi Liverani et al. |
| 7,685,931 B2 | 3/2010 | Rivera |
| 7,703,383 B2 | 4/2010 | Knitel |
| 7,790,211 B2 | 9/2010 | Eijsackers et al. |
| 7,798,054 B2 | 9/2010 | Evers et al. |
| D624,785 S | 10/2010 | Rousselin |
| 7,815,953 B2 | 10/2010 | Mastropasqua et al. |
| 7,828,020 B2 | 11/2010 | Girard et al. |
| 7,832,328 B2 | 11/2010 | Koeling et al. |
| 7,836,819 B2 | 11/2010 | Suggi Liverani et al. |
| 7,878,108 B2 | 2/2011 | Mock et al. |
| 7,891,286 B2 | 2/2011 | Cox, Jr. et al. |
| 7,896,202 B2 | 3/2011 | Greenwald et al. |
| 7,921,766 B2 | 4/2011 | Halliday et al. |
| 7,926,415 B2 | 4/2011 | Yoakim et al. |
| D637,484 S | 5/2011 | Winkler |
| 7,946,217 B2 | 5/2011 | Favre et al. |
| 7,947,316 B2 | 5/2011 | Kirschner et al. |
| 7,964,230 B2 | 6/2011 | Bennett et al. |
| 7,981,451 B2 | 7/2011 | Ozanne |
| 8,028,867 B2 | 10/2011 | Sterngold et al. |
| 8,033,211 B2 | 10/2011 | Halliday et al. |
| 8,039,029 B2 | 10/2011 | Ozanne |
| 8,039,036 B2 | 10/2011 | Knitel et al. |
| 8,043,645 B2 | 10/2011 | Robinson et al. |
| 8,069,775 B2 | 12/2011 | Russo |
| 8,109,200 B2 | 2/2012 | Hansen |
| 8,114,457 B2 | 2/2012 | Robinson et al. |
| 8,114,458 B2 | 2/2012 | Robinson et al. |
| 8,114,459 B2 | 2/2012 | Robinson et al. |
| 8,147,886 B2 | 4/2012 | Knitel et al. |
| 8,147,887 B2 | 4/2012 | Dogan et al. |
| 8,161,868 B2 | 4/2012 | Bolzicco et al. |
| 8,163,318 B2 | 4/2012 | Bourdeau et al. |
| 8,168,247 B2 | 5/2012 | Halliday et al. |
| 8,186,264 B2 | 5/2012 | Rijskamp et al. |
| 8,210,396 B2 | 7/2012 | Girard et al. |
| 8,225,710 B2 | 7/2012 | De Graaff et al. |
| 8,225,712 B2 | 7/2012 | Bunke et al. |
| 8,230,775 B2 | 7/2012 | Vanni |
| 8,257,766 B2 | 9/2012 | Yoakim et al. |
| 8,263,148 B2 | 9/2012 | Yoakim et al. |
| 8,307,754 B2 | 11/2012 | Ternite et al. |
| 8,312,806 B2 | 11/2012 | De Graaff et al. |
| 8,322,271 B2 | 12/2012 | Glucksman et al. |
| 8,327,754 B2 | 12/2012 | Kirschner et al. |
| 8,414,953 B2 | 4/2013 | Robinson et al. |
| 8,425,957 B2 | 4/2013 | Steenhof et al. |
| 8,443,717 B2 | 5/2013 | Venturi |
| 8,464,630 B2 | 6/2013 | Suggi Liverani et al. |
| 8,464,631 B2 | 6/2013 | Suggi Liverani et al. |
| 8,464,632 B2 | 6/2013 | Suggi Liverani et al. |
| 8,524,306 B2 | 9/2013 | Robinson et al. |
| 8,535,743 B2 | 9/2013 | Kamerbeek et al. |
| 8,535,748 B2 | 9/2013 | Robinson et al. |
| 8,541,042 B2 | 9/2013 | Robinson et al. |
| 8,563,058 B2 | 10/2013 | Roulin et al. |
| 8,617,627 B2 | 12/2013 | Steenhof et al. |
| RE44,759 E | 2/2014 | Steenhof et al. |
| 8,656,827 B2 | 2/2014 | Vanni |
| 8,752,478 B2 | 6/2014 | Nocera |
| 8,758,844 B2 | 6/2014 | Nocera |
| 8,784,915 B2 | 7/2014 | Evers et al. |
| 8,800,820 B2 | 8/2014 | Girard et al. |
| 8,808,777 B2 | 8/2014 | Kamerbeek et al. |
| 8,839,710 B2 | 9/2014 | Accursi |
| 8,906,435 B2 | 12/2014 | Kamerbeek et al. |
| 8,962,049 B2 | 2/2015 | Doleac et al. |
| 2001/0000570 A1 | 5/2001 | Aarts |
| 2002/0078831 A1 | 6/2002 | Cai |

(56) References Cited

U.S. PATENT DOCUMENTS

| | | |
|---|---|---|
| 2002/0098268 A1 | 7/2002 | Cohen et al. |
| 2003/0012850 A1 | 1/2003 | Turmel |
| 2003/0096038 A1 | 5/2003 | Cai |
| 2004/0005384 A1 | 1/2004 | Cai |
| 2004/0115310 A1 | 6/2004 | Yoakim et al. |
| 2004/0150390 A1* | 8/2004 | Tsuge .................... G01P 3/443 324/174 |
| 2005/0003060 A1 | 1/2005 | Steenhof et al. |
| 2005/0051478 A1 | 3/2005 | Karanikos et al. |
| 2005/0150390 A1 | 7/2005 | Schifferle |
| 2005/0150391 A1 | 7/2005 | Schifferle |
| 2005/0158426 A1 | 7/2005 | Hu et al. |
| 2005/0166763 A1 | 8/2005 | Cox et al. |
| 2005/0183581 A1 | 8/2005 | Kirschner et al. |
| 2005/0266122 A1 | 12/2005 | Franceschi |
| 2006/0011066 A1* | 1/2006 | Bunn .................... A47J 31/06 99/279 |
| 2006/0065127 A1 | 3/2006 | Dalton et al. |
| 2006/0075903 A1 | 4/2006 | Dijs |
| 2006/0219098 A1 | 10/2006 | Mandralis et al. |
| 2006/0236871 A1 | 10/2006 | Ternite et al. |
| 2006/0280841 A1 | 12/2006 | Cai |
| 2007/0122526 A1 | 5/2007 | Sweeney et al. |
| 2007/0148290 A1 | 6/2007 | Ternite et al. |
| 2007/0157822 A1 | 7/2007 | Fusco |
| 2007/0158366 A1 | 7/2007 | Van Deer Meer et al. |
| 2007/0163446 A1 | 7/2007 | Halliday et al. |
| 2007/0175334 A1 | 8/2007 | Halliday et al. |
| 2007/0181005 A1 | 8/2007 | Kirschner et al. |
| 2007/0261564 A1 | 11/2007 | Suggi Liverani et al. |
| 2007/0289453 A1 | 12/2007 | Halliday et al. |
| 2007/0292584 A1 | 12/2007 | Arrick et al. |
| 2008/0026121 A1* | 1/2008 | Mastropasqua .... B65D 85/8043 426/433 |
| 2008/0089982 A1 | 4/2008 | Brouwer et al. |
| 2008/0105130 A1 | 5/2008 | Koeling et al. |
| 2008/0148958 A1 | 6/2008 | Koeling et al. |
| 2008/0187638 A1 | 8/2008 | Hansen |
| 2008/0254169 A1 | 10/2008 | MacMahon et al. |
| 2008/0260928 A1 | 10/2008 | MacMahon et al. |
| 2008/0299262 A1 | 12/2008 | Reati |
| 2008/0317931 A1 | 12/2008 | Mandralis et al. |
| 2009/0004335 A1 | 1/2009 | MacMahon et al. |
| 2009/0007796 A1 | 1/2009 | Ricotti |
| 2009/0017177 A1 | 1/2009 | Yoakim et al. |
| 2009/0022855 A1 | 1/2009 | Steenhof et al. |
| 2009/0022864 A1 | 1/2009 | Steenhof et al. |
| 2009/0035438 A1 | 2/2009 | Cortese |
| 2009/0047389 A1 | 2/2009 | Jarisch et al. |
| 2009/0104336 A1 | 4/2009 | Fraij et al. |
| 2009/0126577 A1 | 5/2009 | Ternite |
| 2009/0133584 A1 | 5/2009 | De Graaff et al. |
| 2009/0178571 A1 | 7/2009 | Brouwer et al. |
| 2009/0183640 A1 | 7/2009 | Ozanne |
| 2009/0211456 A1 | 8/2009 | De Graaff et al. |
| 2009/0211458 A1 | 8/2009 | Denisart et al. |
| 2009/0217823 A1 | 9/2009 | De Graaff et al. |
| 2009/0223373 A1 | 9/2009 | Kollep et al. |
| 2009/0232944 A1 | 9/2009 | MacMahon et al. |
| 2009/0235825 A1 | 9/2009 | De Graaff et al. |
| 2009/0263545 A1 | 10/2009 | Ozanne |
| 2009/0272274 A1 | 11/2009 | De Graaff et al. |
| 2009/0272275 A1 | 11/2009 | De Graaff et al. |
| 2009/0280219 A1 | 11/2009 | Yoakim et al. |
| 2009/0282987 A1 | 11/2009 | MacMahon et al. |
| 2009/0311384 A1 | 12/2009 | MacMahon et al. |
| 2009/0314167 A1 | 12/2009 | De Graaff et al. |
| 2009/0317518 A1 | 12/2009 | York et al. |
| 2009/0320692 A1 | 12/2009 | Simanski |
| 2009/0320693 A1 | 12/2009 | Ozanne |
| 2010/0000415 A1 | 1/2010 | Vanni |
| 2010/0003371 A1 | 1/2010 | Ozanne |
| 2010/0009039 A1 | 1/2010 | Robinson et al. |
| 2010/0015307 A1 | 1/2010 | Abegglen et al. |
| 2010/0028495 A1 | 2/2010 | Novak et al. |
| 2010/0034929 A1 | 2/2010 | Dogan et al. |
| 2010/0043644 A1 | 2/2010 | Suggi Liverani et al. |
| 2010/0043645 A1 | 2/2010 | Suggi Liverani et al. |
| 2010/0043646 A1 | 2/2010 | Suggi Liverani et al. |
| 2010/0077928 A1 | 4/2010 | Schmed et al. |
| 2010/0078446 A1 | 4/2010 | Halliday et al. |
| 2010/0119685 A1 | 5/2010 | van Bergen |
| 2010/0132564 A1 | 6/2010 | Ozanne et al. |
| 2010/0136183 A1 | 6/2010 | Gonus et al. |
| 2010/0147154 A1 | 6/2010 | De Graaff et al. |
| 2010/0147156 A1 | 6/2010 | Colantonio et al. |
| 2010/0147873 A1 | 6/2010 | Tanner et al. |
| 2010/0163440 A1 | 7/2010 | Tsang |
| 2010/0173055 A1 | 7/2010 | Brouwer et al. |
| 2010/0178391 A1 | 7/2010 | MacMahon et al. |
| 2010/0178392 A1 | 7/2010 | Yoakim et al. |
| 2010/0180774 A1 | 7/2010 | Kollep et al. |
| 2010/0180775 A1 | 7/2010 | Kollep et al. |
| 2010/0186599 A1 | 7/2010 | Yoakim et al. |
| 2010/0189844 A1 | 7/2010 | Brouwer et al. |
| 2010/0203198 A1 | 8/2010 | Yoakim et al. |
| 2010/0239717 A1 | 9/2010 | Yoakim et al. |
| 2010/0239733 A1 | 9/2010 | Yoakim et al. |
| 2010/0239734 A1 | 9/2010 | Yoakim et al. |
| 2010/0260895 A1 | 10/2010 | Yoakim et al. |
| 2010/0260896 A1 | 10/2010 | Yoakim et al. |
| 2010/0282091 A1 | 11/2010 | Doleac et al. |
| 2010/0297299 A1 | 11/2010 | Epars et al. |
| 2010/0303964 A1 | 12/2010 | Beaulieu et al. |
| 2010/0307930 A1 | 12/2010 | Zangerle |
| 2010/0313766 A1 | 12/2010 | Navarini et al. |
| 2010/0323068 A1 | 12/2010 | Gonus et al. |
| 2010/0326283 A1 | 12/2010 | Evers et al. |
| 2011/0003040 A1 | 1/2011 | Graf et al. |
| 2011/0005399 A1 | 1/2011 | Epars et al. |
| 2011/0011273 A1 | 1/2011 | Evers et al. |
| 2011/0020497 A1 | 1/2011 | Steven et al. |
| 2011/0020500 A1 | 1/2011 | Eichler et al. |
| 2011/0027425 A1 | 2/2011 | Heijdel et al. |
| 2011/0033580 A1 | 2/2011 | Biesheuvel et al. |
| 2011/0041702 A1 | 2/2011 | Yoakim et al. |
| 2011/0045144 A1 | 2/2011 | Boussemart et al. |
| 2011/0052761 A1 | 3/2011 | Yoakim et al. |
| 2011/0076361 A1 | 3/2011 | Peterson et al. |
| 2011/0079152 A1 | 4/2011 | Mariller |
| 2011/0113968 A1 | 5/2011 | Schmed et al. |
| 2011/0132199 A1 | 6/2011 | Vanni |
| 2011/0135802 A1 | 6/2011 | Robinson et al. |
| 2011/0135803 A1 | 6/2011 | Robinson et al. |
| 2011/0151075 A1 | 6/2011 | Peterson |
| 2011/0171350 A1 | 7/2011 | Remo |
| 2011/0185910 A1 | 8/2011 | Ryser |
| 2011/0186450 A1 | 8/2011 | Bonacci |
| 2011/0212225 A1 | 9/2011 | Mariller |
| 2011/0248037 A1 | 10/2011 | Fung |
| 2011/0262597 A1 | 10/2011 | Bennett et al. |
| 2011/0271844 A1 | 11/2011 | Mariller et al. |
| 2011/0283891 A1 | 11/2011 | Mariller |
| 2011/0297005 A1 | 12/2011 | Mariller |
| 2011/0305807 A1 | 12/2011 | Koeling et al. |
| 2012/0006205 A1 | 1/2012 | Vanni |
| 2012/0024160 A1 | 2/2012 | Van Os et al. |
| 2012/0031279 A1 | 2/2012 | Mariller et al. |
| 2012/0051672 A1 | 3/2012 | Foss et al. |
| 2012/0070542 A1 | 3/2012 | Camera et al. |
| 2012/0070544 A1 | 3/2012 | Van der Veen et al. |
| 2012/0121765 A1 | 5/2012 | Kamerbeek et al. |
| 2012/0148709 A1 | 6/2012 | Flamand et al. |
| 2012/0189740 A1 | 7/2012 | Ozanne et al. |
| 2012/0199010 A1 | 8/2012 | Mariller |
| 2012/0231123 A1 | 9/2012 | Kamerbeek et al. |
| 2012/0231124 A1 | 9/2012 | Kamerbeek et al. |
| 2012/0231133 A1 | 9/2012 | Kamerbeek et al. |
| 2012/0251668 A1 | 10/2012 | Wong et al. |
| 2012/0251669 A1 | 10/2012 | Kamerbeek et al. |
| 2012/0251670 A1 | 10/2012 | Kamerbeek et al. |
| 2012/0251671 A1 | 10/2012 | Kamerbeek et al. |
| 2012/0251672 A1 | 10/2012 | Kamerbeek et al. |
| 2012/0251694 A1 | 10/2012 | Kamerbeek et al. |

(56) References Cited

U.S. PATENT DOCUMENTS

| | | |
|---|---|---|
| 2012/0258210 A1 | 10/2012 | Wong et al. |
| 2012/0258219 A1 | 10/2012 | Biesheuvel et al. |
| 2012/0258221 A1 | 10/2012 | Biesheuvel et al. |
| 2012/0263829 A1 | 10/2012 | Kamerbeek et al. |
| 2012/0263830 A1 | 10/2012 | Kamerbeek et al. |
| 2012/0263833 A1 | 10/2012 | Wong et al. |
| 2012/0267395 A1 | 10/2012 | Biewenga |
| 2012/0276252 A1 | 11/2012 | Bolinger et al. |
| 2012/0276264 A1 | 11/2012 | Rivera |
| 2012/0328740 A1 | 12/2012 | Nocera |
| 2013/0011521 A1 | 1/2013 | Weijers et al. |
| 2013/0040021 A1 | 2/2013 | Digiuni |
| 2013/0045308 A1* | 2/2013 | Gorbatenko ....... B65D 85/8043 426/84 |
| 2013/0095218 A1 | 4/2013 | De Graaff et al. |
| 2013/0230625 A1 | 9/2013 | Brouwer et al. |
| 2013/0295240 A1 | 11/2013 | Wong et al. |
| 2013/0312620 A1 | 11/2013 | Mariller |
| 2013/0319252 A1 | 12/2013 | Castelli et al. |
| 2013/0341478 A1 | 12/2013 | Mariller |
| 2014/0010926 A1 | 1/2014 | Digiuni |
| 2014/0065269 A1 | 3/2014 | Favre |
| 2014/0174300 A1 | 6/2014 | Husband et al. |
| 2014/0178538 A1 | 6/2014 | Husband et al. |
| 2014/0220189 A1 | 8/2014 | Giovanni |
| 2014/0220190 A1 | 8/2014 | Giovanni |
| 2014/0220205 A1 | 8/2014 | Kamerbeek et al. |
| 2014/0242309 A1 | 8/2014 | Foss et al. |
| 2015/0110929 A1 | 4/2015 | Camera et al. |
| 2015/0259134 A1 | 9/2015 | Mack et al. |
| 2016/0145038 A1 | 5/2016 | Apone et al. |
| 2016/0214787 A1 | 7/2016 | Iotti |

FOREIGN PATENT DOCUMENTS

| | | |
|---|---|---|
| CA | 2400033 | 8/2001 |
| CA | 2366837 A1 | 7/2002 |
| CA | 2349507 A1 | 12/2002 |
| CA | 2780774 A1 | 1/2003 |
| CA | 2108753 | 5/2004 |
| CA | 2513719 | 8/2004 |
| CA | 2513723 | 8/2004 |
| CA | 2513765 | 8/2004 |
| CA | 2513995 | 8/2004 |
| CA | 2514072 | 8/2004 |
| CA | 2514144 | 8/2004 |
| CA | 2547583 | 6/2005 |
| CA | 2555089 | 9/2005 |
| CA | 2555329 | 9/2005 |
| CA | 2555775 | 9/2005 |
| CA | 2556421 | 9/2005 |
| CA | 2560841 | 10/2005 |
| CA | 2560846 | 10/2005 |
| CA | 2399290 | 1/2006 |
| CA | 2574961 | 2/2006 |
| CA | 2581630 A1 | 4/2006 |
| CA | 2586422 | 5/2006 |
| CA | 2448474 C | 12/2006 |
| CA | 2622933 | 4/2007 |
| CA | 2650388 | 11/2007 |
| CA | 2651921 | 11/2007 |
| CA | 2656878 A1 | 1/2008 |
| CA | 2657846 | 1/2008 |
| CA | 2660119 | 2/2008 |
| CA | 2661921 A1 | 3/2008 |
| CA | 2629268 | 10/2008 |
| CA | 2684669 | 11/2008 |
| CA | 2686347 A1 | 12/2008 |
| CA | 2701826 A1 | 1/2009 |
| CA | 2517624 C | 4/2009 |
| CA | 2643479 | 5/2009 |
| CA | 2713149 A1 | 9/2009 |
| CA | 2697823 | 9/2010 |
| CA | 2496416 | 10/2010 |
| CA | 2764942 A1 | 12/2010 |
| CA | 2764946 A1 | 12/2010 |
| CA | 2764949 A1 | 12/2010 |
| CA | 2765131 A1 | 12/2010 |
| CA | 2765132 A1 | 12/2010 |
| CA | 2765134 A1 | 12/2010 |
| CA | 2765136 A1 | 12/2010 |
| CA | 2765320 A1 | 12/2010 |
| CA | 2765322 A1 | 12/2010 |
| CA | 2765323 A1 | 12/2010 |
| CA | 2765324 A1 | 12/2010 |
| CA | 2765325 A1 | 12/2010 |
| CA | 2765383 A1 | 12/2010 |
| CA | 2765388 A1 | 12/2010 |
| CA | 2765456 A1 | 12/2010 |
| CA | 2765468 A1 | 12/2010 |
| CA | 2521063 C | 5/2011 |
| CA | 2662071 C | 7/2011 |
| CA | 2538256 | 8/2011 |
| CA | 2531544 C | 5/2012 |
| CA | 2662069 C | 1/2013 |
| DE | 3140244 | 4/1983 |
| DE | 3501786 | 7/1986 |
| DE | 102004056224 | 5/2006 |
| DE | 102005016297 | 10/2006 |
| DE | 202006013189 | 11/2006 |
| DE | 202004021229 | 5/2007 |
| DE | 102005058336 | 6/2007 |
| DE | 602004007479 | 4/2008 |
| EP | 57671 | 8/1982 |
| EP | 114717 | 8/1984 |
| EP | 188299 | 7/1986 |
| EP | 224297 | 6/1987 |
| EP | 272922 | 6/1988 |
| EP | 309708 | 4/1989 |
| EP | 337615 | 10/1989 |
| EP | 389141 | 9/1990 |
| EP | 493856 | 12/1990 |
| EP | 449533 | 10/1991 |
| EP | 451980 | 10/1991 |
| EP | 455337 | 11/1991 |
| EP | 468079 | 1/1992 |
| EP | 471094 | 2/1992 |
| EP | 512148 | 11/1992 |
| EP | 512468 | 11/1992 |
| EP | 521510 | 1/1993 |
| EP | 524464 | 1/1993 |
| EP | 377849 B1 | 4/1993 |
| EP | 554469 | 8/1993 |
| EP | 638486 | 8/1994 |
| EP | 615921 | 9/1994 |
| EP | 584314 B1 | 7/1996 |
| EP | 761148 | 3/1997 |
| EP | 806373 | 11/1997 |
| EP | 821906 | 2/1998 |
| EP | 844195 | 5/1998 |
| EP | 860375 | 8/1998 |
| EP | 904717 | 3/1999 |
| EP | 1042978 | 10/2000 |
| EP | 1166697 | 1/2002 |
| EP | 1167204 | 1/2002 |
| EP | 1188400 | 3/2002 |
| EP | 1190959 | 3/2002 |
| EP | 1243210 | 9/2002 |
| EP | 1247756 | 10/2002 |
| EP | 1273528 | 1/2003 |
| EP | 1221418 B1 | 5/2003 |
| EP | 1369356 | 12/2003 |
| EP | 1440636 | 7/2004 |
| EP | 1440903 | 7/2004 |
| EP | 1440904 | 7/2004 |
| EP | 1440905 | 7/2004 |
| EP | 1440906 | 7/2004 |
| EP | 1440907 | 7/2004 |
| EP | 1440908 | 7/2004 |
| EP | 1440909 | 7/2004 |
| EP | 1440911 | 7/2004 |
| EP | 1440912 | 7/2004 |
| EP | 1440913 | 7/2004 |

(56) References Cited

FOREIGN PATENT DOCUMENTS

| | | |
|---|---|---|
| EP | 1440914 | 7/2004 |
| EP | 1462042 | 9/2004 |
| EP | 1529739 | 5/2005 |
| EP | 1398279 | 6/2005 |
| EP | 1574452 | 9/2005 |
| EP | 1579791 | 9/2005 |
| EP | 1579792 | 9/2005 |
| EP | 1579793 | 9/2005 |
| EP | 1580143 | 9/2005 |
| EP | 1580144 | 9/2005 |
| EP | 1604915 | 12/2005 |
| EP | 1654966 | 5/2006 |
| EP | 1440910 B1 | 6/2006 |
| EP | 1676786 | 7/2006 |
| EP | 1700548 | 9/2006 |
| EP | 1702543 | 9/2006 |
| EP | 1710173 | 10/2006 |
| EP | 1599395 B1 | 1/2007 |
| EP | 1608569 B1 | 1/2007 |
| EP | 1767467 | 3/2007 |
| EP | 1775234 | 4/2007 |
| EP | 1418135 B1 | 5/2007 |
| EP | 1785369 | 5/2007 |
| EP | 1646304 B1 | 7/2007 |
| EP | 1808382 | 7/2007 |
| EP | 1815750 | 8/2007 |
| EP | 1826148 | 8/2007 |
| EP | 1839543 | 10/2007 |
| EP | 1847481 | 10/2007 |
| EP | 1849715 | 10/2007 |
| EP | 1864917 | 12/2007 |
| EP | 1886942 | 2/2008 |
| EP | 1547499 B1 | 3/2008 |
| EP | 1894850 | 3/2008 |
| EP | 1894853 | 3/2008 |
| EP | 1894854 | 3/2008 |
| EP | 1908706 | 4/2008 |
| EP | 1716069 B1 | 5/2008 |
| EP | 1929904 | 6/2008 |
| EP | 1974638 | 10/2008 |
| EP | 1975087 | 10/2008 |
| EP | 1977651 | 10/2008 |
| EP | 1980155 | 10/2008 |
| EP | 1982933 | 10/2008 |
| EP | 1985213 | 10/2008 |
| EP | 1792850 | 11/2008 |
| EP | 1997748 A1 | 12/2008 |
| EP | 1883587 B1 | 5/2009 |
| EP | 2058243 | 5/2009 |
| EP | 2062831 | 5/2009 |
| EP | 2070454 | 6/2009 |
| EP | 2093164 | 8/2009 |
| EP | 2095716 | 9/2009 |
| EP | 2098144 | 9/2009 |
| EP | 2100824 | 9/2009 |
| EP | 2119640 | 11/2009 |
| EP | 1892199 | 12/2009 |
| EP | 2141093 | 1/2010 |
| EP | 2151313 | 2/2010 |
| EP | 2165937 | 3/2010 |
| EP | 2168469 | 3/2010 |
| EP | 2134611 B1 | 6/2010 |
| EP | 1983871 B1 | 7/2010 |
| EP | 2210540 | 7/2010 |
| EP | 2210826 | 7/2010 |
| EP | 2210827 | 7/2010 |
| EP | 1811880 | 8/2010 |
| EP | 2037782 B1 | 8/2010 |
| EP | 2228320 | 9/2010 |
| EP | 2230195 | 9/2010 |
| EP | 2233051 | 9/2010 |
| EP | 2236060 | 10/2010 |
| EP | 2236437 | 10/2010 |
| EP | 2239211 | 10/2010 |
| EP | 2239212 | 10/2010 |
| EP | 2263501 | 12/2010 |
| EP | 2279845 | 2/2011 |
| EP | 2284100 | 2/2011 |
| EP | 2284101 | 2/2011 |
| EP | 2284102 | 2/2011 |
| EP | 2287090 | 2/2011 |
| EP | 2139792 B1 | 3/2011 |
| EP | 2289820 | 3/2011 |
| EP | 2298667 | 3/2011 |
| EP | 2308776 | 4/2011 |
| EP | 2155586 B1 | 7/2011 |
| EP | 2343247 | 7/2011 |
| EP | 2345351 | 7/2011 |
| EP | 2345602 | 7/2011 |
| EP | 2303077 B1 | 8/2011 |
| EP | 2364930 A2 | 9/2011 |
| EP | 2374733 A1 | 10/2011 |
| EP | 2387922 A1 | 11/2011 |
| EP | 2234522 B1 | 12/2011 |
| EP | 1648274 B1 | 2/2012 |
| EP | 2465792 A2 | 6/2012 |
| EP | 2306871 B1 | 7/2012 |
| EP | 2166903 B1 | 8/2012 |
| EP | 2484605 A1 | 8/2012 |
| EP | 2367741 B1 | 9/2012 |
| EP | 2510802 A2 | 10/2012 |
| EP | 2510803 A2 | 10/2012 |
| EP | 2510804 A2 | 10/2012 |
| EP | 2510805 A2 | 10/2012 |
| EP | 2510843 A2 | 10/2012 |
| EP | 2442699 B1 | 4/2013 |
| EP | 2367736 B1 | 5/2013 |
| EP | 2426065 B1 | 5/2013 |
| EP | 13183463.2 | 9/2013 |
| GB | 1376074 | * 1/1972 |
| GB | 1376074 | 12/1974 |
| IT | 1210982 A | 9/1989 |
| IT | 1256690 | 3/1992 |
| IT | 1307241 | 4/1999 |
| IT | MI032423 | 6/2005 |
| IT | MI061503 | 1/2008 |
| IT | TO090216 | 3/2009 |
| IT | TO080631 | 2/2010 |
| NL | 8500029 A | 8/1986 |
| NL | 8503092 A | 6/1987 |
| NL | 8600958 A | 11/1987 |
| NL | 9002815 A | 7/1992 |
| NL | 9400837 A | 1/1996 |
| NL | 1001120 C2 | 3/1997 |
| NL | 1002929 C2 | 10/1997 |
| NL | 1003716 C2 | 2/1998 |
| NL | 1005328 C2 | 8/1998 |
| NL | 1007171 C2 | 3/1999 |
| NL | 1019013 C2 | 3/2003 |
| NL | 1020835 C2 | 12/2003 |
| NL | 1021325 C2 | 2/2004 |
| NL | 1024012 C2 | 2/2005 |
| NL | 1024160 C2 | 2/2005 |
| NL | 1026068 C2 | 10/2005 |
| NL | 1026437 C2 | 12/2005 |
| NL | 1026834 C2 | 2/2006 |
| NL | 1029155 C2 | 4/2006 |
| NL | 1028101 C2 | 7/2006 |
| NL | 1029503 C2 | 1/2007 |
| NL | 1032292 C2 | 5/2007 |
| NL | 1031622 C2 | 10/2007 |
| NL | 1032080 C2 | 10/2007 |
| NL | 1032081 C2 | 10/2007 |
| NL | 1032082 C2 | 10/2007 |
| NL | 1032085 C2 | 10/2007 |
| NL | 1032087 C2 | 10/2007 |
| NL | 1032090 C2 | 10/2007 |
| NL | 1032091 C2 | 10/2007 |
| NL | 1033968 C2 | 12/2008 |
| NL | 2001539 C2 | 10/2009 |
| WO | WO 92/07775 | 5/1992 |
| WO | WO 93/17932 | 9/1993 |
| WO | WO 00/51478 A1 | 9/2000 |
| WO | WO 00/56629 | 9/2000 |

(56) References Cited

FOREIGN PATENT DOCUMENTS

| | | |
|---|---|---|
| WO | WO 01/58786 | 8/2001 |
| WO | WO 01/60219 | 8/2001 |
| WO | WO 01/60220 | 8/2001 |
| WO | WO 01/60712 | 8/2001 |
| WO | WO 02/058522 A2 | 8/2002 |
| WO | WO 02/080744 | 10/2002 |
| WO | WO 02/081327 | 10/2002 |
| WO | WO 02/082963 | 10/2002 |
| WO | WO 03/059778 | 7/2003 |
| WO | WO 03/073896 A1 | 9/2003 |
| WO | WO 2004/005136 A1 | 1/2004 |
| WO | WO 2004/018326 | 3/2004 |
| WO | WO 2004/026091 | 4/2004 |
| WO | WO 2004/064584 | 8/2004 |
| WO | WO 2004/065225 | 8/2004 |
| WO | WO 2004/065256 | 8/2004 |
| WO | WO 2004/065257 | 8/2004 |
| WO | WO 2004/065258 | 8/2004 |
| WO | WO 2004/065259 | 8/2004 |
| WO | WO 2004/083071 A1 | 9/2004 |
| WO | WO 2004/084687 | 10/2004 |
| WO | WO 2005/009865 | 2/2005 |
| WO | WO 2005/018394 | 3/2005 |
| WO | WO 2005/026018 | 3/2005 |
| WO | WO 2005/054080 | 6/2005 |
| WO | WO 2005/056423 | 6/2005 |
| WO | WO 2005/066040 A2 | 7/2005 |
| WO | WO 2005/079637 | 9/2005 |
| WO | WO 2005/079638 | 9/2005 |
| WO | WO 2005/079639 | 9/2005 |
| WO | WO 2005/080222 | 9/2005 |
| WO | WO 2005/092160 | 10/2005 |
| WO | WO 2005/092162 | 10/2005 |
| WO | WO 2005/105609 | 11/2005 |
| WO | WO 2005/122780 A1 | 12/2005 |
| WO | WO 2005/122851 | 12/2005 |
| WO | WO 2006/008243 | 1/2006 |
| WO | WO 2006/014936 | 2/2006 |
| WO | WO 2006/016813 | 2/2006 |
| WO | WO 2006/021405 | 3/2006 |
| WO | WO 2006/037062 A1 | 4/2006 |
| WO | WO 2006/043096 | 4/2006 |
| WO | WO 2006/043098 | 4/2006 |
| WO | WO 2006/043102 | 4/2006 |
| WO | WO 2006/043103 | 4/2006 |
| WO | WO 2006/043104 | 4/2006 |
| WO | WO 2006/043106 | 4/2006 |
| WO | WO 2006/043108 | 4/2006 |
| WO | WO 2006/045536 | 5/2006 |
| WO | WO 2006/045537 | 5/2006 |
| WO | WO 2006/057022 A1 | 6/2006 |
| WO | WO 2006/043109 | 7/2006 |
| WO | WO 2007/008067 | 1/2007 |
| WO | WO 2007/025773 | 3/2007 |
| WO | WO 2007/039032 | 4/2007 |
| WO | WO 2007/042414 | 4/2007 |
| WO | WO 2007/054479 | 5/2007 |
| WO | WO 2007/056097 | 5/2007 |
| WO | WO 2007/096196 | 8/2007 |
| WO | WO 2007/113100 | 10/2007 |
| WO | WO 2007/120045 | 10/2007 |
| WO | WO 2007/120046 | 10/2007 |
| WO | WO 2007/120047 | 10/2007 |
| WO | WO 2007/120048 | 10/2007 |
| WO | WO 2007/120049 | 10/2007 |
| WO | WO 2007/120050 | 10/2007 |
| WO | WO 2007/120051 | 10/2007 |
| WO | WO 2007/120052 | 10/2007 |
| WO | WO 2007/122206 | 11/2007 |
| WO | WO 2007/122208 | 11/2007 |
| WO | WO 2007/125337 | 11/2007 |
| WO | WO 2007/131559 | 11/2007 |
| WO | WO 2007/137974 | 12/2007 |
| WO | WO 2007/141202 | 12/2007 |
| WO | WO 2008/011913 | 1/2008 |
| WO | WO 2008/018794 | 2/2008 |
| WO | WO 2008/025715 | 3/2008 |
| WO | WO 2008/025730 | 3/2008 |
| WO | WO 2008/025785 | 3/2008 |
| WO | WO 2008/087553 | 7/2008 |
| WO | WO 2008/090122 | 7/2008 |
| WO | WO 2008/113779 | 9/2008 |
| WO | WO 2008/116818 | 10/2008 |
| WO | WO 2008/123775 | 10/2008 |
| WO | WO 2008/126045 | 10/2008 |
| WO | WO 2008/129053 | 10/2008 |
| WO | WO 2008/132571 | 11/2008 |
| WO | WO 2008/144462 | 11/2008 |
| WO | WO 2008/148604 | 12/2008 |
| WO | WO 2008/148650 | 12/2008 |
| WO | WO 2008/148834 | 12/2008 |
| WO | WO 2008/153383 | 12/2008 |
| WO | WO 2009/053811 | 4/2009 |
| WO | WO 2009/092628 | 7/2009 |
| WO | WO 2009/092629 | 7/2009 |
| WO | WO 2009/110783 | 9/2009 |
| WO | WO 2009/112291 | 9/2009 |
| WO | WO 2009/114119 | 9/2009 |
| WO | WO 2009/115475 | 9/2009 |
| WO | WO 2009/128016 | 10/2009 |
| WO | WO 2009/133134 | 11/2009 |
| WO | WO 2010/006936 | 1/2010 |
| WO | WO 2010/009975 | 1/2010 |
| WO | WO 2010/014201 | 2/2010 |
| WO | WO 2010/016753 | 2/2010 |
| WO | WO 2010/018540 | 2/2010 |
| WO | WO 2010/033023 | 3/2010 |
| WO | WO 2010/038213 | 4/2010 |
| WO | WO 2010/041179 | 4/2010 |
| WO | WO 2010/055465 A1 | 5/2010 |
| WO | WO 2010/066705 | 6/2010 |
| WO | WO 2010/066736 | 6/2010 |
| WO | WO 2010/076048 | 7/2010 |
| WO | WO 2010/076698 | 7/2010 |
| WO | WO 2010/079454 | 7/2010 |
| WO | WO 2010/084475 | 7/2010 |
| WO | WO 2010/092543 A2 | 8/2010 |
| WO | WO 2010/095937 | 8/2010 |
| WO | WO 2010/106516 | 9/2010 |
| WO | WO 2010/112353 | 10/2010 |
| WO | WO 2010/116284 | 10/2010 |
| WO | WO 2010/126365 | 11/2010 |
| WO | WO 2010/128028 | 11/2010 |
| WO | WO 2010/128031 | 11/2010 |
| WO | WO 2010/128051 | 11/2010 |
| WO | WO 2010/128844 | 11/2010 |
| WO | WO 2010/134036 A1 | 11/2010 |
| WO | WO 2010/137945 | 12/2010 |
| WO | WO 2010/137946 | 12/2010 |
| WO | WO 2010/137947 | 12/2010 |
| WO | WO 2010/137948 | 12/2010 |
| WO | WO 2010/137949 | 12/2010 |
| WO | WO 2010/137950 | 12/2010 |
| WO | WO 2010/137951 | 12/2010 |
| WO | WO 2010/137952 A1 | 12/2010 |
| WO | WO 2010/137953 | 12/2010 |
| WO | WO 2010/137954 | 12/2010 |
| WO | WO 2010/137955 | 12/2010 |
| WO | WO 2010/137956 A1 | 12/2010 |
| WO | WO 2010/137957 A1 | 12/2010 |
| WO | WO 2010/137958 A1 | 12/2010 |
| WO | WO 2010/137959 A1 | 12/2010 |
| WO | WO 2010/137960 A1 | 12/2010 |
| WO | WO 2010/137961 | 12/2010 |
| WO | WO 2010/137961 A1 | 12/2010 |
| WO | WO 2010/137962 A1 | 12/2010 |
| WO | WO 2010/137963 | 12/2010 |
| WO | WO 2010/137963 A1 | 12/2010 |
| WO | WO 2010/137965 A1 | 12/2010 |
| WO | WO 2010/137966 A1 | 12/2010 |
| WO | WO 2010/138563 A1 | 12/2010 |
| WO | WO 2010/146101 A1 | 12/2010 |
| WO | WO 2011/000723 A2 | 1/2011 |
| WO | WO 2011/000725 A1 | 1/2011 |

(56) References Cited

FOREIGN PATENT DOCUMENTS

| | | |
|---|---|---|
| WO | WO 2011/015973 A1 | 2/2011 |
| WO | WO 2011/027259 | 3/2011 |
| WO | WO 2011/029873 A1 | 3/2011 |
| WO | WO 2011/031294 A2 | 3/2011 |
| WO | WO 2011/037464 A1 | 3/2011 |
| WO | WO 2011/042489 A1 | 4/2011 |
| WO | WO 2011/048377 A1 | 4/2011 |
| WO | WO 2011/061126 A2 | 5/2011 |
| WO | WO 2011/069830 A1 | 6/2011 |
| WO | WO 2011/075638 A1 | 6/2011 |
| WO | WO 2011/089048 A1 | 7/2011 |
| WO | WO 2011/092301 A1 | 8/2011 |
| WO | WO 2011/117768 | 9/2011 |
| WO | WO 2012/004878 A1 | 1/2012 |
| WO | WO 2012/077066 A1 | 6/2012 |
| WO | WO 2012/080908 A1 | 6/2012 |
| WO | WO 2012/104768 | 8/2012 |
| WO | WO 2012/120459 | 9/2012 |
| WO | WO 2012/122329 A1 | 9/2012 |
| WO | WO 2012/125032 A2 | 9/2012 |
| WO | WO 2012/127233 A2 | 9/2012 |
| WO | WO 2012/134313 A1 | 10/2012 |
| WO | WO 2012/150542 | 11/2012 |
| WO | WO 2012/164521 A1 | 12/2012 |
| WO | WO 2013/043048 | 3/2013 |
| WO | WO 2013/066178 | 5/2013 |
| WO | WO 2013/080073 | 6/2013 |
| WO | WO 2013/122460 | 8/2013 |
| WO | WO 2013/124234 | 8/2013 |
| WO | WO 2013/153473 | 10/2013 |
| WO | WO 2013/153526 | 10/2013 |
| WO | WO 2013/168083 | 11/2013 |
| WO | WO 2013/183023 | 12/2013 |
| WO | WO 2014/006527 | 1/2014 |
| WO | WO 2014/007639 | 1/2014 |
| WO | WO 2014/037842 | 3/2014 |
| WO | WO 2014/126463 | 8/2014 |
| WO | WO 2014/126464 | 8/2014 |
| WO | WO 2014/158656 A1 | 10/2014 |
| WO | WO 2015/032787 A1 | 3/2015 |
| WO | WO 2016/081307 A1 | 5/2016 |

OTHER PUBLICATIONS

International Preliminary Report on Patentability in corresponding International Application No. PCT/US2014/019135, mailed Mar. 13, 2015, in 15 pages.
Extended Search Report in corresponding European Patent Application No. 14773424.8, dated Oct. 10, 2016, in 9 pages.
International Search Report and Written Opinion in corresponding International Application No. PCT/US2014/019135, mailed Jun. 12, 2014, 9 pages.
A.G. Gonzalez et al., "HPLC analysis of tocopherols and triglycerides in coffee and their use as authentication parameters," Food Chemistry, vol. 73, Issue 1, Apr. 2001, pp. 93-101.
Office Action in corresponding Chinese Patent Application No. 201480014706.1, dated Oct. 8, 2016, in 15 pages.

* cited by examiner (Known Art)

(Known Art)

STRETCHABLE BEVERAGE CARTRIDGES AND METHODS

INCORPORATION BY REFERENCE TO ANY PRIORITY APPLICATIONS

All applications for which a foreign or domestic priority claim is identified in the Application Data Sheet as filed with the present application are hereby incorporated by reference herein under 37 C.F.R. §1.57.

The present application claims a priority benefit under 35 U.S.C. §119(e) of U.S. Provisional Application Serial No. 61/786,072, filed Mar. 14, 2013, the entirety of which is hereby incorporated by reference herein.

FIELD

The present disclosure relates to a cartridge containing a single serving of an instant beverage component for producing a beverage when fluid is introduced into the cartridge. The cartridge can be configured for use with single-serve beverage machines.

DESCRIPTION OF CERTAIN RELATED ART

FIG. 1 illustrates beverage capsule 10 known in the art. The capsule 10 includes a container 12 with a bottom wall 13, a side wall 14, a cover 15, and a shoulder 16. The capsule 10 contains coffee grounds 17 for producing a coffee beverage when water is introduced into the capsule 10. During the brewing process, the bottom wall 13 of the capsule 10 is pierced so that water is introduced into the capsule 10 and mixes with the coffee grounds 17. The coffee beverage then exits through the cover 15 of the capsule 10, which cover 15 has been ruptured to produce a number of openings or perforations.

FIG. 2 illustrates another beverage cartridge 20 known in the art. The cartridge 20 includes a hollow base 22, a filter element 24, and a cover 25. The base 22 is cup-shaped with a side wall 26 closed at one end by a substantially flat bottom wall 27 and defining a circular access opening 28 at the opposite end. The cover 25 is secured to a radially outwardly protruding lip 29 surrounding the access opening 28. The filter element 24 is disposed within the hollow base 22 and attached to the base 22 adjacent the lip 29. The filter element 24 defines a first chamber 21a and a second chamber 21b. The first chamber 21a contains coffee grounds 23 for producing a coffee beverage when water is introduced into the cartridge 20. During the brewing process, the cover 25 is pierced so that water is introduced into the first chamber 21 and mixes with the coffee grounds 23. The coffee beverage then passes through the filter 24 (which removes the used coffee grounds from the coffee beverage) and into the second chamber 21b. The coffee beverage then exits the cartridge 20 through the bottom 27 of the cartridge 20, which has also been pierced to produce an opening.

SUMMARY OF THE DISCLOSURE

Single-serve beverage machines are devices that are designed to produce a single serving, or sometimes a single cup, of a desired beverage. In comparison to other types of beverage machines (such as drip coffee makers having a multi-cup carafe), single-serve beverage machines can, for example, enhance convenience by reducing the time to prepare the beverage. Furthermore, single-serve beverage machines can decrease waste by reducing the likelihood of producing excess amounts of the beverage, which may go unused and be subsequently discarded.

Some single-serve beverage machines employ a cartridge or capsule containing one or more beverage components or precursors to produce the beverage. Generally, such cartridges are received in the single-serve beverage machine, are used to produce the single serving of the beverage, and are subsequently removed from the machine and discarded. However, as the cartridges typically are typically used only once, it can be desirable to reduce the complexity and the number of parts of the cartridges, thus reducing production and manufacturing costs and reducing waste.

Moreover, as the cartridges are generally disposable items, it can be desirable for the cartridge to be readily degradable. For example, it can be beneficial for the cartridge to be biodegradable and/or compostable. Such cartridges can promote the process of degradation (e.g., conversion into gases and organic material by microorganisms). As such, the space occupied by the discarded cartridges, such as in a landfill or compost heap, can be reduced and the constituent elements of the cartridges can be reused. Such cartridge embodiments thus provide an ecologically sensitive alternative to non-degradable cartridges.

In certain instances, it can also be advantageous for the cartridge to facilitate compression of its contents. For example, in the production of espresso, the coffee grounds are typically compressed before brewing the beverage. Among other things, such compression can facilitate the extraction of certain flavor and aroma compounds. A cartridge configured to facilitate compression of the contents can thus provide, for example, a beverage with enhanced flavor and aroma compared to cartridges not configured for such compression.

According to some embodiments, a single-serve beverage cartridge includes a generally hollow body portion. The body portion can have a chamber, a sidewall, a first end, and a second end. The first end can have a radially outwardly extending lip. The second end can have a radially inwardly extending flange. The cartridge can also include a beverage component or precursor positioned in the chamber. A first filter element can be joined with the lip. The first filter element can be configured to allow passage of liquid therethrough. A second filter element can be joined with the flange and configured to allow passage of liquid therethrough.

In some variants, the first filter element is further configured to deform into the chamber when engaged with a tamping head so as to facilitate compression of the beverage component or precursor in the cartridge. In some embodiments, the first filter element is configured to deform by stretching. In certain variants, the first filter element is configured to deform by unfolding. Certain implementations of the first filter element and the second filter element are configured to not be at least one of: separated from the hollow body portion, pierced, or ruptured.

In some embodiments, the cartridge includes biodegradable materials. In some variants, the body portion and at least one of the first and second filter elements include polylactic acid. In some embodiments, the first filter element is configured to stretch along an axial axis of the cartridge. For example, the first filter element can be configured to stretch along the axial axis of the cartridge at least about: 0.25 mm, 0.5 mm, 1 mm, 1.5 mm, 2 mm, 2.5 mm, 3 mm, values between the aforementioned values, or otherwise. In some variants, the first filter element is configured to stretch between about 1 mm and about 2 mm along the axial axis of the cartridge. Some implementation can stretch up to about 7 mm along the axial axis. In some embodiments, the first filter element can be configured to stretch at least about 50% of an overall height of the cartridge.

According to certain implementations, the cartridge includes a frame configured to support the body portion. Some variants of the frame have a network of struts. The struts can be coupled with the sidewall. Some embodiments of the cartridge have a plurality of mating engagement members configured to facilitate stacking. In certain implementations, each of the plurality of mating engagement members include a radially inwardly extending rib.

A certain variants, at least one of the first and second filter elements have a plurality of layers. At least one of the first and second filter elements can have first and second layers with a third layer positioned therebetween. In some implementations, the first and second layers can have woven fibers and the third layer can have non-woven fibers.

Some embodiments of the cartridge include a baffle. The baffle can be coupled with the second filter element. The baffle can be configured to direct a flow of liquid around the baffle and through the second filter element. In some variants, the second end comprises a restricting orifice. In some implementations, the beverage component or precursor includes espresso coffee grounds.

According to some embodiments, a method of preparing a single serving of a beverage includes providing a cartridge for insertion into a single-serve beverage machine. The cartridge can have a body portion having a sidewall. Some embodiments of the cartridge include a generally planar first filter element coupled with a first end of the body portion. In some variants, the cartridge includes a generally planar second filter element coupled with a second end of the body portion. The cartridge can include a chamber defined by the body portion, the first filter element, and the second filter element. Some embodiments of the cartridge include a beverage component or precursor positioned in the chamber. Certain implementations of the method include extending a tamping head of the machine into the chamber of the cartridge, thereby deforming the first filter element into a non-planar configuration. In some embodiments, the method includes compressing the beverage component or precursor in the cartridge. Certain variants of the method include introducing liquid through the first filter element and into communication with the beverage component or precursor to form a beverage. Some embodiments of the method include dispensing the beverage through the second filter element. In some variants of the method, the cartridge comprises biodegradable materials.

In some embodiments, deforming the first filter element does not comprise piercing the first filter element. In certain variants, the beverage component or precursor comprises espresso coffee grounds and the beverage comprises an espresso beverage. In some implementations, the method includes forming a pressure differential between the chamber and the ambient environment, the pressure differential created due to the second filter element having a greater flow resistance than the first filter element. Some variants of the method include deforming the first filter element comprises stretching the first filter element. Certain embodiments of the method include deforming the first filter element comprises unfolding the first filter element.

In some implementations, a single-serve beverage cartridge includes a generally hollow body portion. The body portion can have a chamber, a sidewall, a first end, and a second end. The first end can have a radially outwardly extending lip. The second end can have a radially inwardly extending flange. Some embodiments include a beverage component or precursor positioned in the chamber. In some variants, a first filter element is joined with the first end of the hollow body portion. The first filter element can be configured to allow passage of liquid therethrough. Certain embodiments have a second filter element joined with the second end of the hollow body portion. The second filter element can be configured to allow passage of liquid therethrough.

BRIEF DESCRIPTION OF THE FIGURES

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

DETAILED DESCRIPTION

The following discussion is presented to enable a person skilled in the art to make and use one or more of the present embodiments. The general principles described herein may be applied to embodiments and applications other than those detailed below without departing from the spirit and scope of the disclosure. Indeed, the present embodiments are not intended to be limited to the particular embodiments shown, but are to be accorded the widest scope consistent with the principles and features disclosed or suggested herein.

Figure 1:
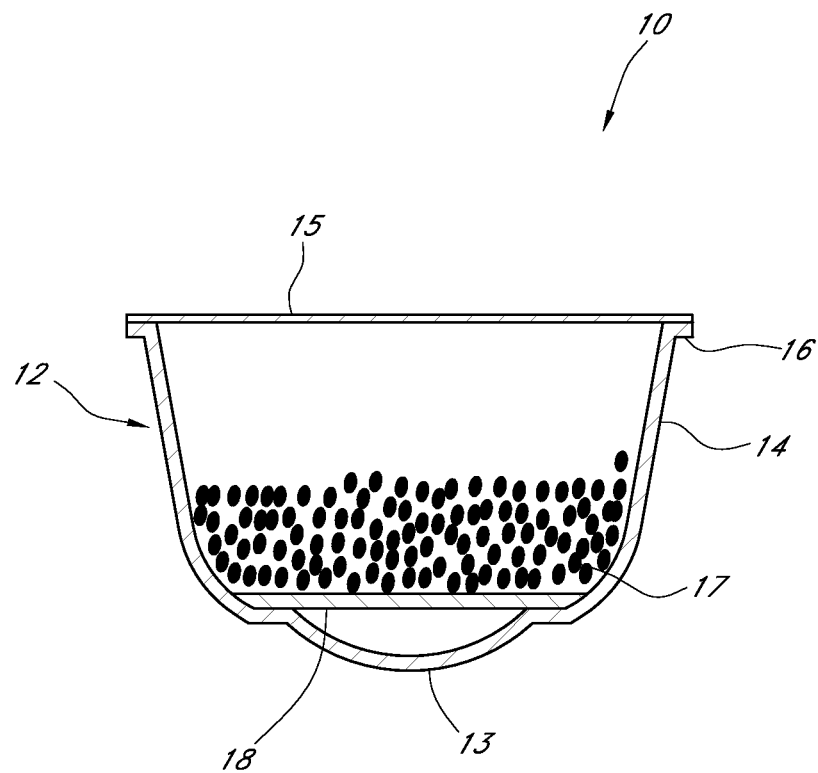
FIG. 1 illustrates a schematic cross-sectional representation of a pierceable beverage cartridge known in the art.
Figure 2:
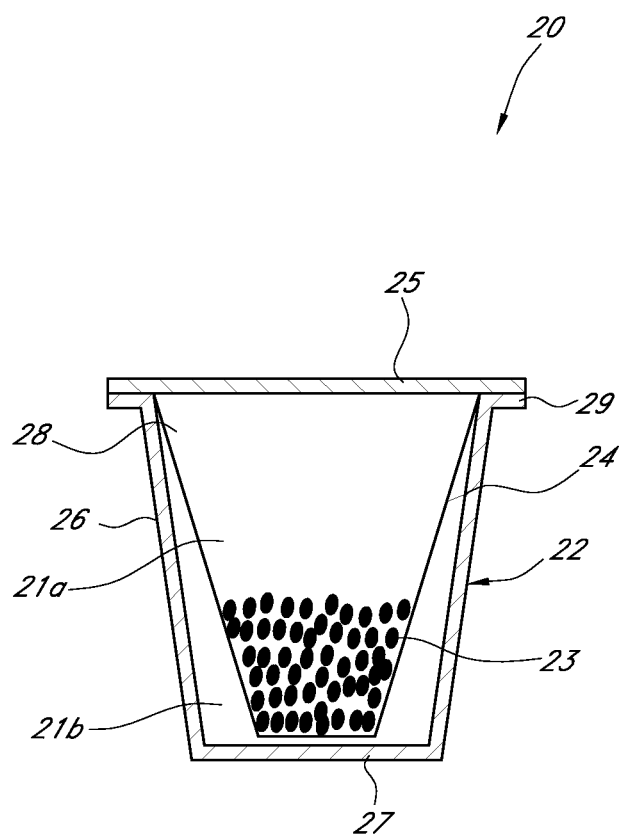
FIG. 2 illustrates a schematic cross-sectional representation of another pierceable beverage cartridge known in the art.
Figure 3A:
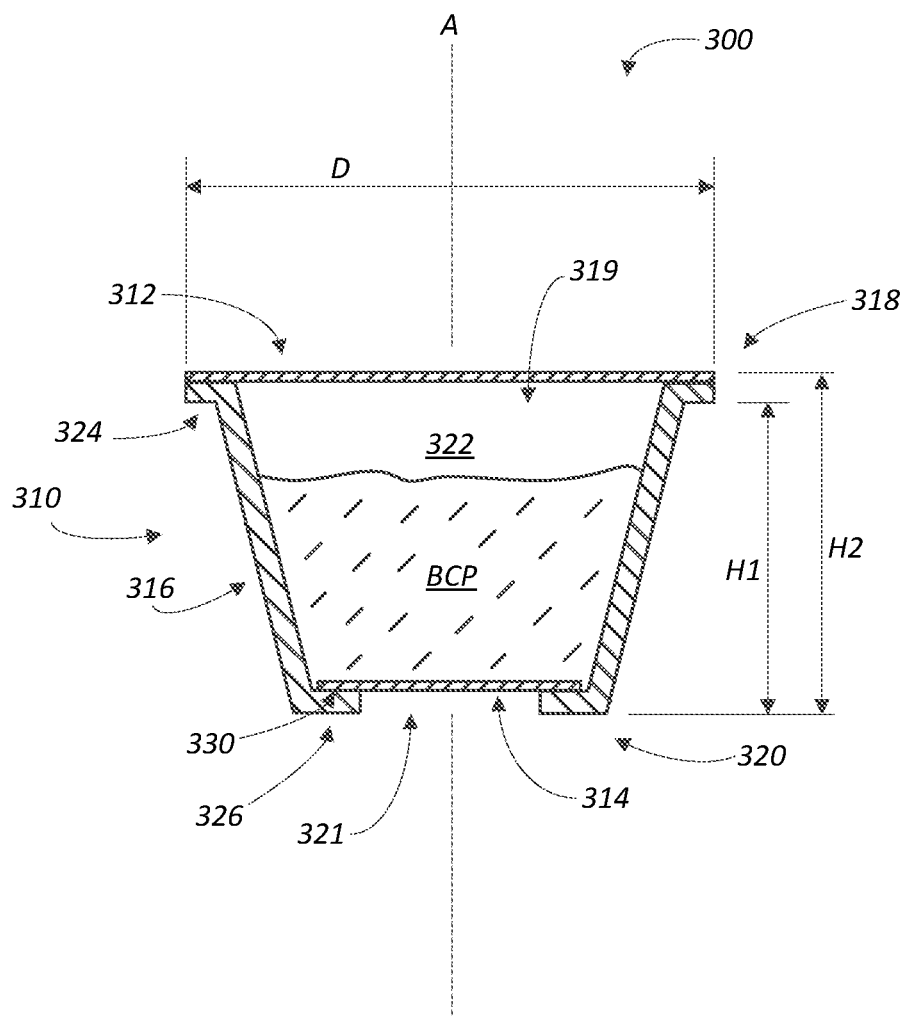
FIG. 3A illustrates a cross-sectional representation of an embodiment of a cartridge in accordance with the present disclosure.

With regard to FIG. 3A, a cross-sectional representation of a single-serve beverage cartridge 300 is illustrated. The term "cartridge" as used herein shall be given its ordinary and customary meaning, and shall include, without limitation, cartridges, capsules, cups, pods, and the like. Certain embodiments of the cartridge 300 are configured for use in a single-serve beverage machine, such as an automatic single-serve coffee brewer.

According to some embodiments, the cartridge 300 includes a body portion 310, a first filter element 312, and a second filter element 314. The body portion 310 can be a generally hollow structure having a sidewall 316, a first end 318, and a second end 320. The first end 318 can include a first aperture 319. The second end 320 can include a second aperture 321. In some embodiments, the first end 318 is coupled with (e.g., generally covered or closed by) the first filter element 312 and the second end 320 is coupled with the second filter element 314. As such, the body portion 310, first filter element 312, and second filter element 314 can define a generally closed chamber 322 in the cartridge 300. In various embodiments, the chamber 322 can include a beverage component or precursor (BCP), as discussed in further detail below. Some variants of the body portion 310 have a gradually tapered and generally cylindrical shape. However, other shapes can be used without departing from the spirit and/or scope of the disclosure. As shown, the cartridge can have an axial axis A. In some embodiments, the axial axis A extends between radial center points of the first and second ends 318, 320 and/or of the first and second filter elements 312, 314.

Certain embodiments of the body portion 310 have a first filter engagement member 324, such as a radially-outwardly extending shoulder or lip or flange, located at or near the first end 318. Some embodiments have a second filter engagement member 326, such as a radially-inwardly extending shoulder or lip or flange, located at or near the second end. In certain implementations, the first filter engagement member 324 is configured to join with the first filter element 312, such as by adhesive, compression (e.g., pinching, crimping, or the like), UV-curing, thermal or sonic welding, or otherwise. In some embodiments, the second filter engagement member 326 is configured to join with the second filter element 314. In some implementations, the second filter member 314 is configured to join with the sidewall 316. In some variants, at least one of the first and second filter elements 312, 314 are joined with the body portion 310 during a forming operation, such as during a molding operation. In some variants, at least one of the first and second filter elements 312, 314 are joined with the body portion 310 by welding, such as ultrasonic or thermal welding. Certain implementations of the first and/or second filter engagement member 324, 326 have a rounded (e.g., rolled) edge.

In some embodiments, at least one of the first and second filter elements 312, 314 is joined with an outer surface (e.g., directed outwardly from the chamber 322) of the body portion 310. For example, the first filter element 312 can be joined with an outer surface 328 of the first filter engagement member 324 of the body portion 310. According to certain implementations, at least one of the first and second filter elements 312, 314 is joined with an inside surface (e.g., directed inwardly toward the chamber 322) of the body portion 310. For example, the second filter element 314 can be joined with an inside surface 330 of the second filter engagement member 326 of the body portion 310.

Various embodiments of the first and second filter elements 312, 314 can facilitate the preparation of a beverage. For example, at least the first filter element 312 can permit the introduction of liquid, such as water or milk, into the cartridge 300. The liquid can engage with the beverage component or precursor to form a beverage. In various embodiments, the beverage can be discharged from the cartridge 300 via at least the second filter element 314. In some embodiments, at least one of the filter elements 312, 314 is configured to allow passage of liquid under pressure, such as at least about: 0.25 bar, 0.5 bar, 1 bar, 2 bar, 3 bar, 4 bar, 6 bar, 7, bar, 8 bar, 9 bar, 10 bar, 12 bar, values between the aforementioned values, and otherwise. In some embodiments, the introduced liquid can impinge the beverage component or precursor and/or the body portion 310. In some implementations, the filter elements 312, 314 are configured to inhibit passage of the beverage component or precursor. For example, the filter elements 312, 314 can include voids or openings configured to inhibit (e.g., by the size, shape, and/or location of the voids or openings) passage of the beverage component or precursor yet allow the passage of the liquid.

Several configurations of the filter elements 312, 314 are contemplated. Certain implementations of the first and/or second filter element 312, 314 have a web of woven or non-woven fibers. In certain embodiments, the fibers are organized, such as in a generally regular pattern or mesh. Some variants have a web of generally randomly distributed fibers. In some embodiments, the filter elements 312, 314 are generally the same, such as having the same materials and/or generally the same structure. In some embodiments, the filter elements 312, 314 are dissimilar. For example, one of the filter elements 312, 314 can have woven fibers and the other of the filter elements 312, 314 can have non-woven fibers.

The first and/or second filter elements 312, 314 can include a single layer or multiple layers. For example, some embodiments have at least two layers of fibers. Certain variants have a "sandwiched" configuration in which a third layer (or a fourth layer, fifth layer, or more) is positioned between the first and second layers. Some embodiments having a sandwiched configuration can aid in filtering, facilitate the creation of a pressure inside cartridge, and/or assist in the preparation of certain beverages, such as espresso. In some implementations, peripheries of the first and second layers are generally coupled together, such as by thermal bonding. In various embodiments, the layers can be the same or different. For example, a first layer can be made of a first type (e.g., fiber size, material, woven or non-woven, or otherwise) and the second layer can be a different type (different in at least one of fiber size, material, woven or non-woven, or otherwise compared to the first type). In some variants, the first and second layers are the same type and a sandwiched third layer is a different type.

In some implementations, the filter elements 312, 314 have generally the same resistance to the passage of liquid therethrough. Other implementations have filter elements 312, 314 with different flow resistances, relative to each other. For example, the second filter element 314 can have a greater resistance to the passage of liquid therethrough than the first filter element 312, which can provide a backpressure in the cartridge 300 during beverage preparation. In certain other embodiments, the first filter element 312 has a greater resistance to the passage of liquid therethrough than the second filter element 314.

In some embodiments, at least one of the filter elements 312, 314 is configured to stretch and/or unfold. For example, at least one of the filter elements 312, 314 can be generally flexible, resilient, pleated, folded, and/or otherwise. In some embodiments, at least one of the filter elements 312, 314 can be configured such to allow compression of the beverage component or precursor in the cartridge. Such compression (also called tamping) of the beverage component or precursor can be desirable in the preparation of some beverages, such as espresso. In various embodiments, at least one of the filter elements 312, 314 is configured to elastically deform, thereby allowing the least one of the filter elements 312, 314 to generally return to its initial position after stretching. Some embodiments of the filter elements 312, 314 are configured to generally not rupture or break when stretched during tamping. Several implementations of the filter elements 312, 314 are not configured to be pierced, such as by a piercing member, needle, or the like. Moreover, in several implementations, the filter elements 312, 314 are configured not to separate, tear, or break away from the portions of the body portion 310 to which they are joined.

Figure 3B:
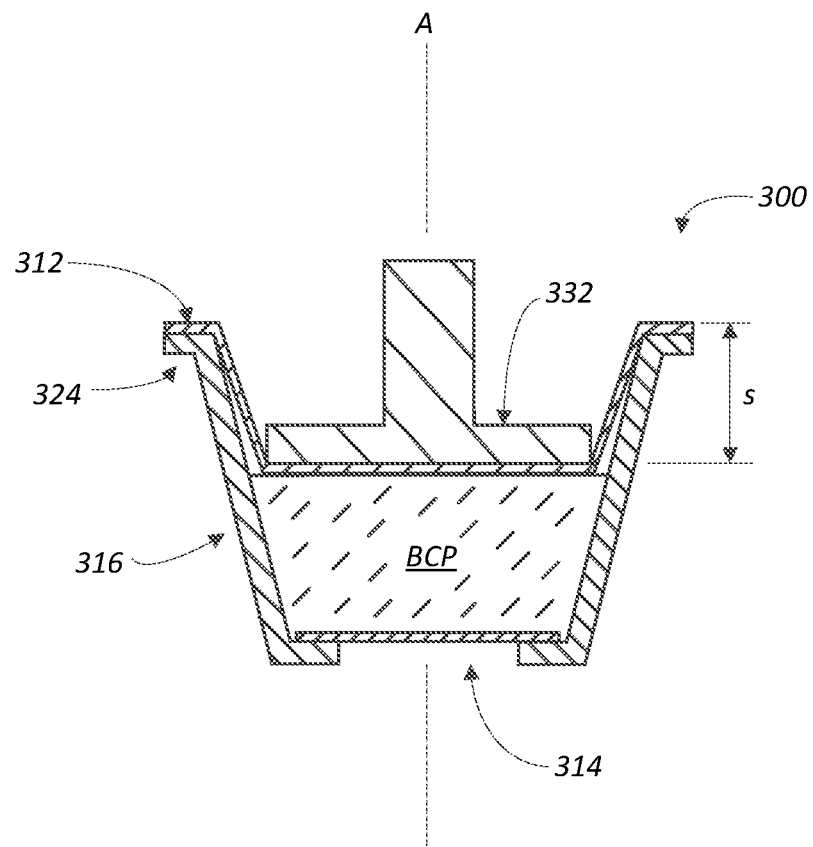
FIG. 3B illustrates the cartridge of FIG. 3A in a stretched configuration.
Figure 4A:
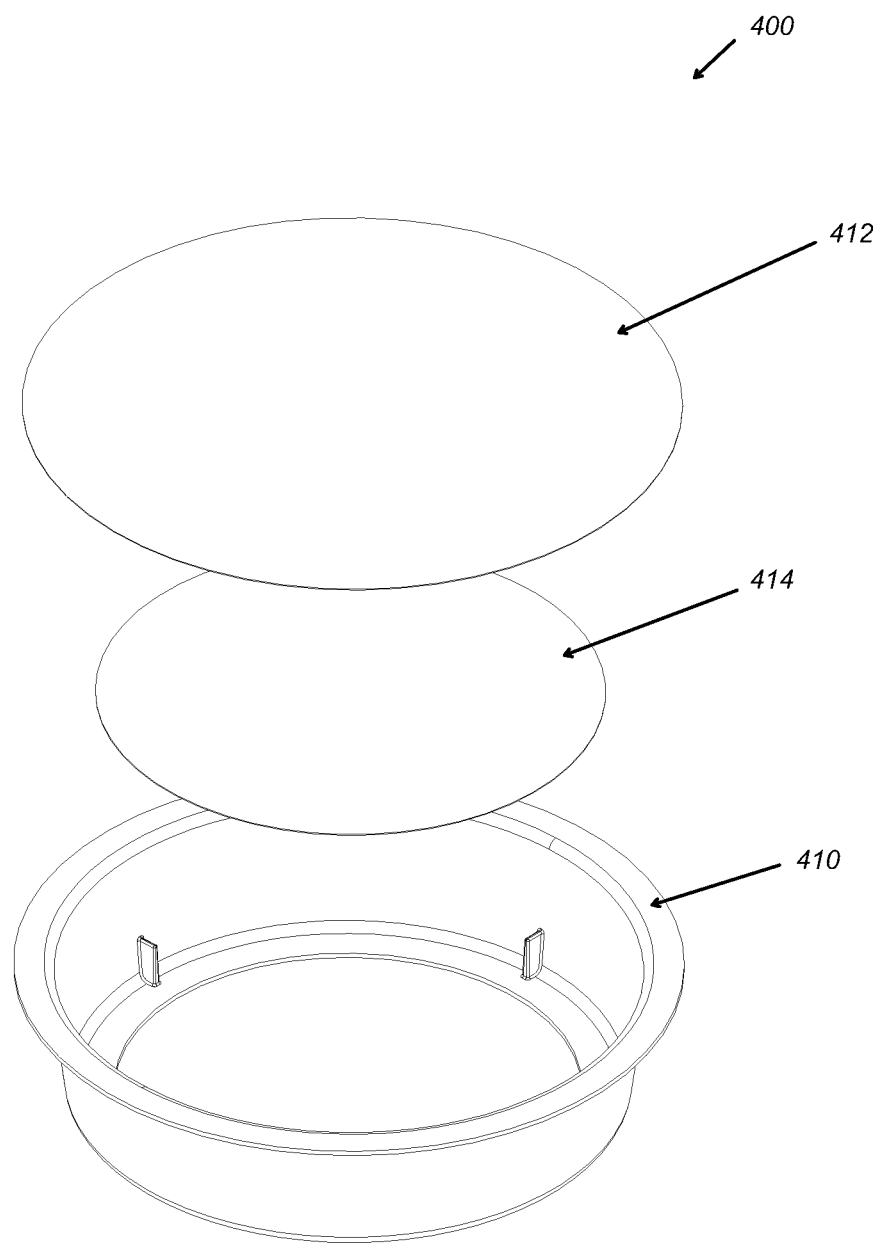
FIG. 4A illustrates an exploded top perspective view of another embodiment of a cartridge.
Figure 4B:
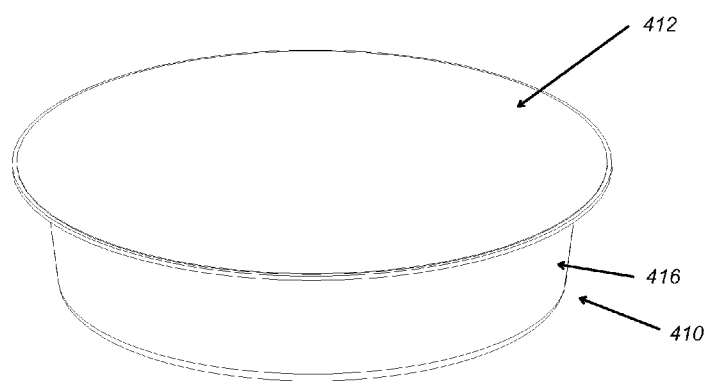
FIG. 4B illustrates a top perspective view of the cartridge of FIG. 4A.
Figure 4C:
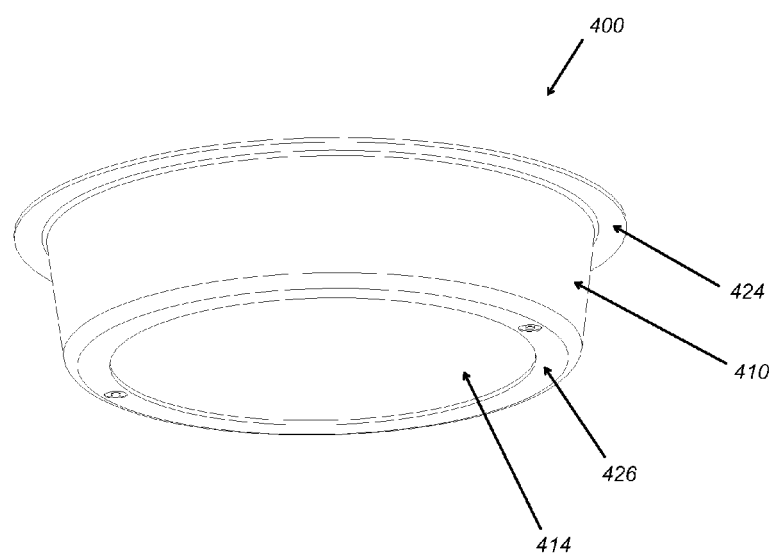
FIG. 4C illustrates a bottom perspective view of the cartridge of FIG. 4A.
Figure 4D:
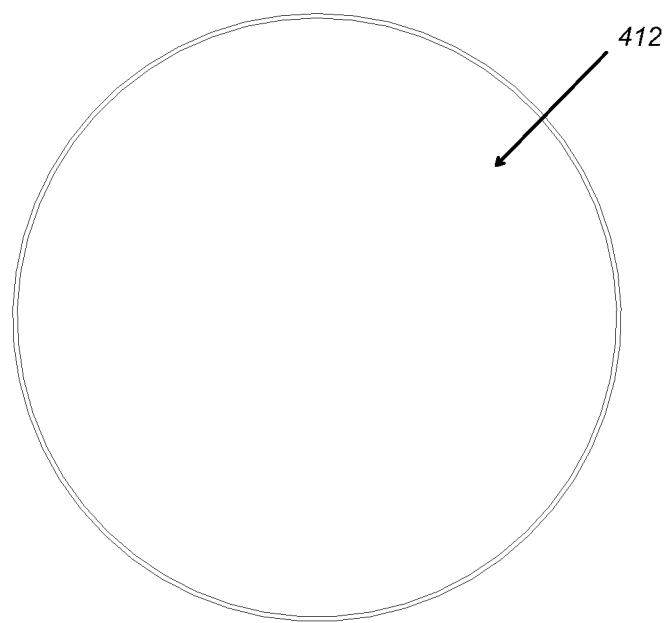
FIG. 4D illustrates a top view of the cartridge of FIG. 4A.
Figure 4E:
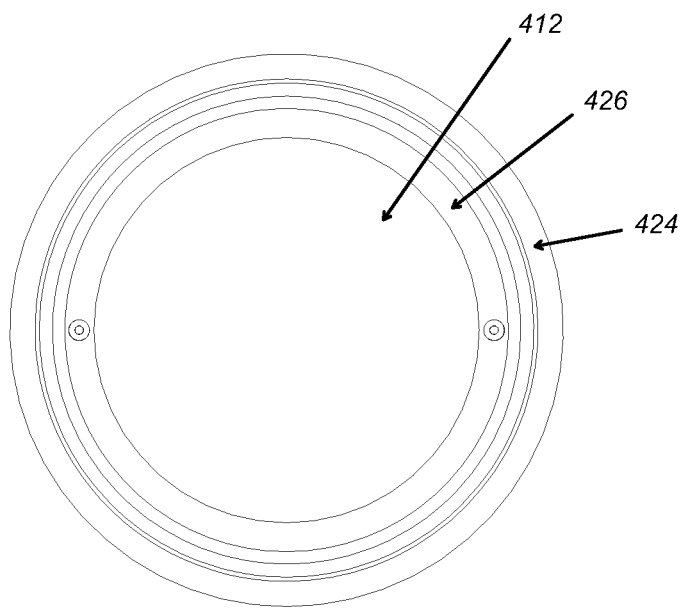
FIG. 4E illustrates a bottom view of the cartridge of FIG. 4A.
Figure 4F:
FIG. 4F illustrates a cross-sectional view of the cartridge of FIG. 4A.
Figure 5A:
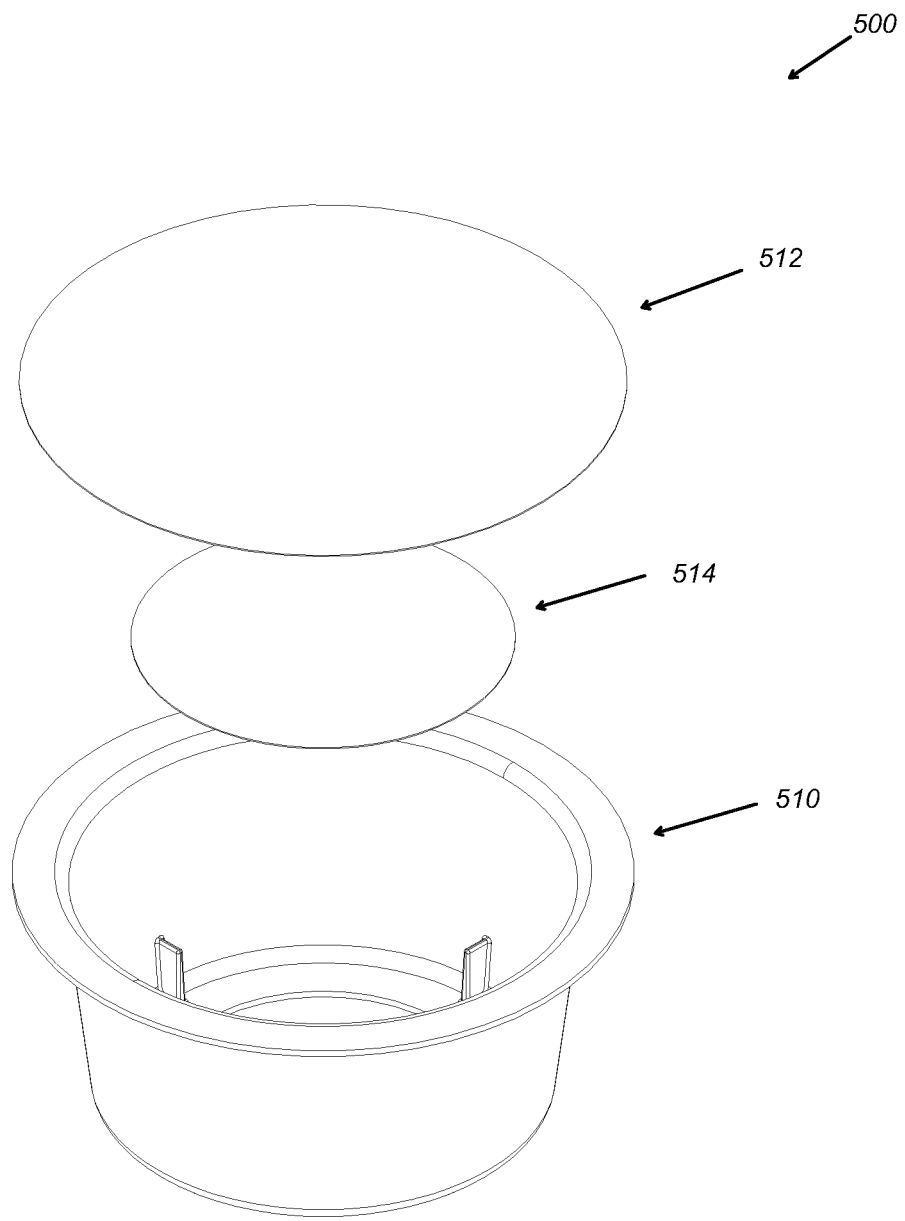
FIG. 5A illustrates an exploded top perspective view of another embodiment of a cartridge.
Figure 5B:
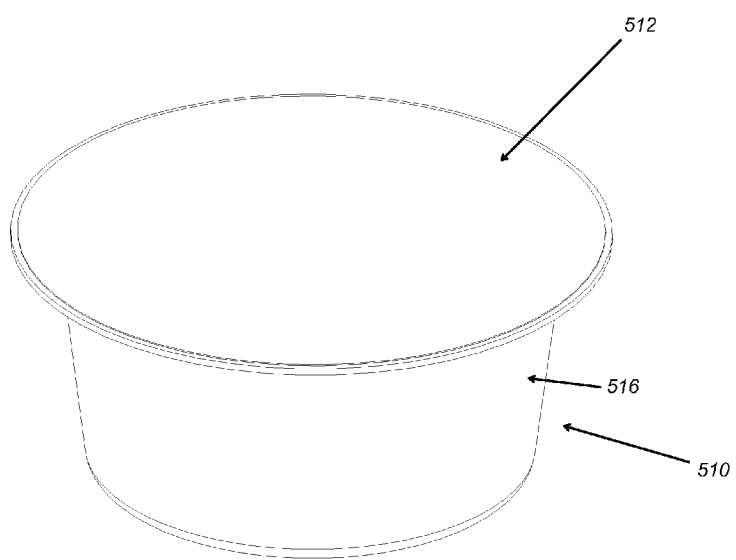
FIG. 5B illustrates a top perspective view of the cartridge of FIG. 5A.
Figure 5C:
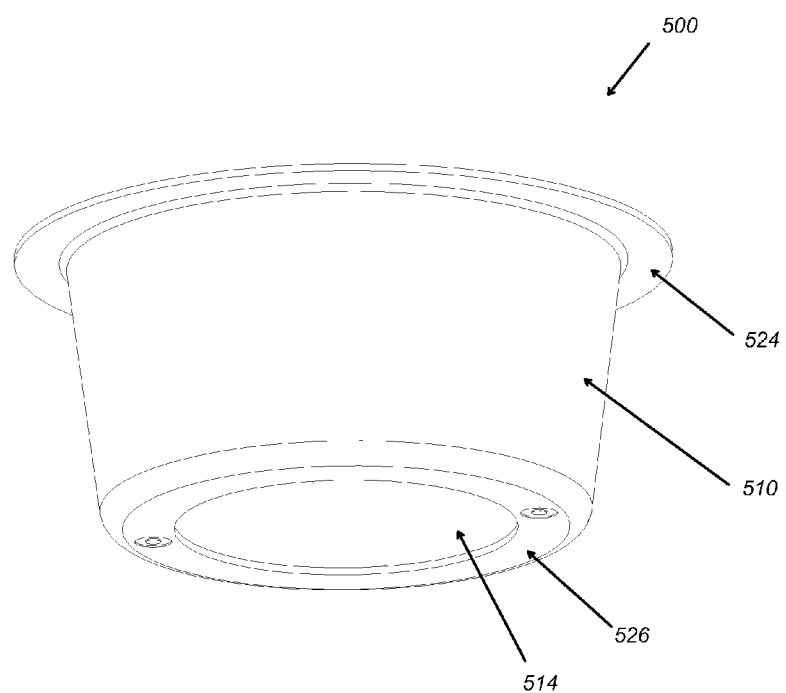
FIG. 5C illustrates a bottom perspective view of the cartridge of FIG. 5A.
Figure 5D:
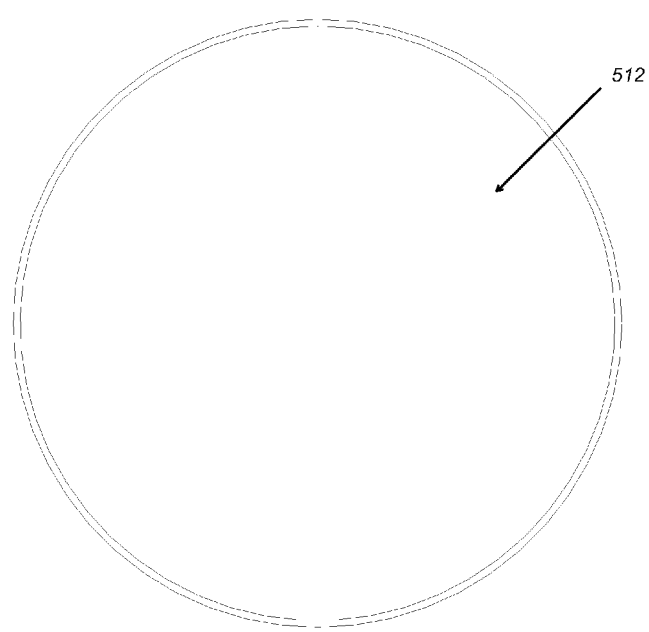
FIG. 5D illustrates a top view of the cartridge of FIG. 5A.
Figure 5E:
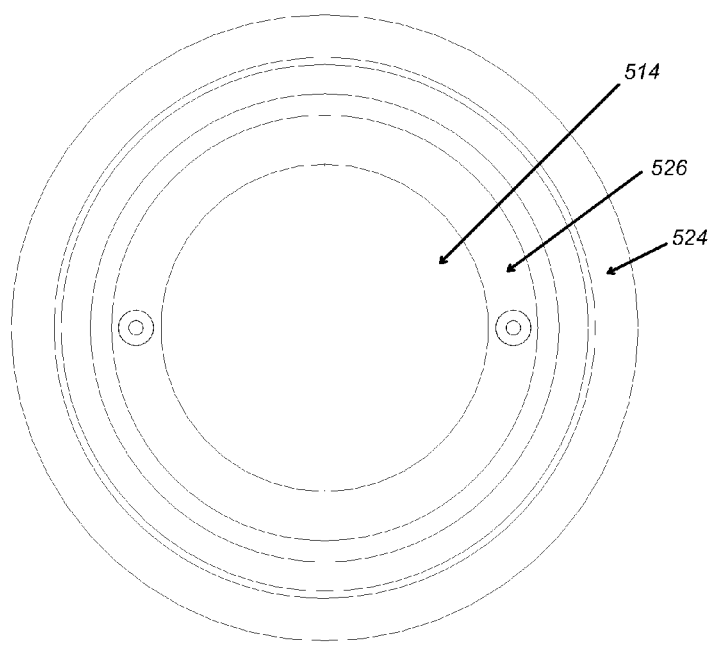
FIG. 5E illustrates a bottom view of the cartridge of FIG. 5A.
Figure 5F:
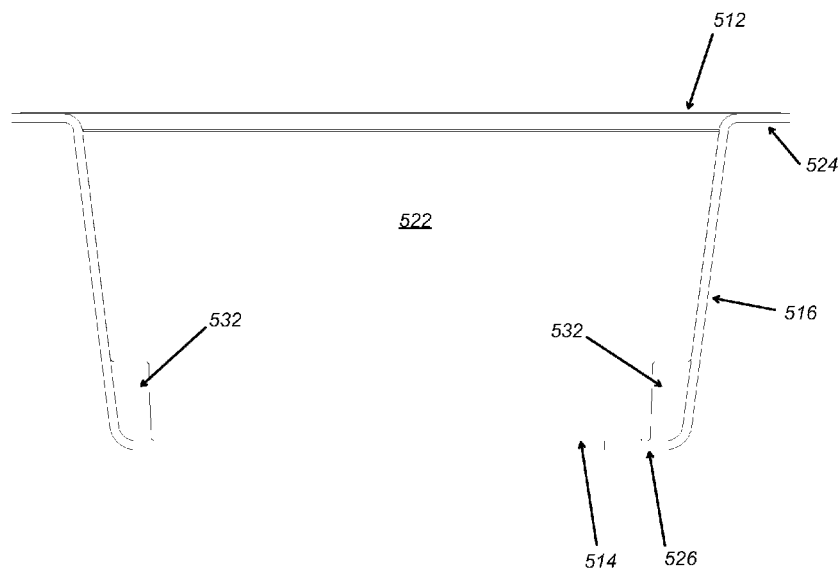
FIG. 5F illustrates a cross-sectional view of the cartridge of FIG. 5A.

To facilitate tamping, at least one of the filter elements 312, 314 can be configured to provide sufficient stretching or unfolding such that a tamping head 332 or other structure can be received at least partly in the chamber 322 of the cartridge 300. For example, as illustrated in FIG. 3B, the first filter element 312 can be configured to elastically deform (e.g., stretch) when pressed by the tamping head 332. Such deformation can result in at least part of the first filter element 312 and the tamping head 332 being received in the chamber 322, which in turn can allow the tamping head 332 to compress the beverage component or precursor, without piercing or rupturing the first and/or second filter element 312, 314 or causing the first filter element to separate, tear or break away from the portions of the body portion 310 to which they are joined. In some embodiments, a portion (e.g., a generally central portion) of the first filter element 312 is configured to detach, break-away from, or otherwise separate from another portion (e.g., a peripheral portion) of the first filter element 312, such as during tamping. In some stretched or unfolded configurations, the first filter element 312 can have a generally curved, bowed, or frustoconical shape (see FIG. 3B). In contrast, when not stretched or unfolded, in some embodiments one or both of the filter elements 312, 314 can be generally planar (see FIG. 3A). In other embodiments, when not stretched or unfolded, at least one of the filter elements 312, 314 can be non-planar. For example, a support or other structure (e.g., a hemispherical insert) in the cartridge 300 can shape at least one of the filter elements 312, 314 into a domed configuration.

Various amounts of deformation are contemplated. For example, in some embodiments, at least one of the filter elements 312, 314 is configured (e.g., is sufficiently stretchable) to allow the tamping head to penetrate into the cartridge 300 at least about: 0.25 mm, 0.5 mm, 1 mm, 1.5 mm, 2 mm, 3 mm, 4 mm, 5 mm, 10 mm, 15 mm, 20 mm, values between the aforementioned values, or otherwise. In some implementations, at least one of the filter elements 312, 314 has a portion that is configured to deform (e.g., elongate) to a greater extent than another portion, such as a peripheral region that is configured to deform more than a central region. In certain variants, the first filter element 312 is configured to unfold, unfurl, open, or otherwise when engaged by the tamping head 332, thereby expanding the first filter element 312 into the chamber 322 and permitting the tamping head 332 to extend into the chamber 322. For example, when viewed in cross-section, the first filter element 312 can include a generally undulating, zig-zagging, or bellows-shaped portion, which can be configured to unfold during tamping. In some embodiments, the first filter element 312 is not deformed during the process of preparing of certain beverages, such as brewed coffee. In various embodiments, the first filter element 312 is configured to deform up to about 60% of an overall cartridge height H2 (measured from a top of the first filter 312 to the bottom of the second filter engagement member 326) of the cartridge 300. Certain implementations are configured to deform less than or equal to about 30% of the overall cartridge height H2. Some variants, are configured to deform less than or equal to about 15% of the overall cartridge height H2.

According to some embodiments, the first filter element 312 is configured to stretch a stretch distance S, which is generally parallel to the axial axis A. In certain implementations, the stretch distance S is greater than or equal to about: 0.25 mm, 0.5 mm, 1 mm, 1.5 mm, 2 mm, 3 mm, 4 mm, 5 mm, 6 mm, 7 mm, 8 mm, 9, mm, 10 mm, 11 mm, 12 mm, values between the aforementioned values, or otherwise. In various embodiments, the stretching of the first filter element 312 does not damage (e.g., rupture) the first filter element 312. In certain embodiments, the stretching of the first filter element 312 does not separate the first filter element 312 from the first filter engagement member 324. In some implementations, a circumferential edge of first filter element 312 remains joined with the first filter engagement member 324 before, during, and after stretching of the first filter element 312. In some implementations, after stretching, the first filter element 312 returns to a generally planar configuration.

As noted above, the cartridge 300 can have a variety of sizes and shapes. Some embodiments have a cross-sectional shape that is generally circular, elliptical, or otherwise curved. Certain embodiments have a cross-sectional shape that is generally triangular, rectangular (e.g., square), pentagonal, hexagonal, octagonal, star-shaped, or otherwise regular. Some embodiments have a non-regular cross-sectional shape. Furthermore, as indicated above, certain embodiments of the cartridge have a tapered configuration, also called a sidewall draft. For example, some variants have a sidewall 316 with a taper angle (relative to the axial axis A) of at least about 5° and/or less than or equal to about 10°. In certain implementations, the sidewall draft is about 7°. In some embodiments, the sidewall 316 is generally water and/or gas impermeable. In certain embodiments, the sidewall 316 has no holes, openings, or the like. In some variants, the chamber 322 of the cartridge 300 comprises a volume of at least about 43 cubic centimeters and/or less than or equal to about 50 cubic centimeters. Certain implementations of the chamber 322 have a volume of at least about 65 cubic centimeters.

As shown, the cartridge 300 can also have a cartridge insertion height H1, which is measured generally parallel to the axial axis A and from a bottom of the first filter engagement member 324 to a bottom of the second filter engagement member 326. In some embodiments, the cartridge insertion height H1 is greater than or equal to about 12 mm and/or less than or equal to about 20 mm. In certain implementations, the overall cartridge height H2 is at least about 15 mm. In some embodiments, the overall cartridge height H2 is at least about 19 mm.

In some embodiments, the cartridge 300 has an outside diameter D, which is measured at the outside edges of the filter engagement member 324. Certain implementations have an outside diameter of greater than or equal to about 10 mm and/or less than or equal to about 100 mm. Certain variants have an outside diameter between about 20 mm and about 80 mm. Some embodiments have an outside diameter between about 40 mm and about 70 mm, such as about: 40 mm, 45 mm, 50 mm, 55 mm, 60 mm, 65 mm, 70 mm, values between the aforementioned values, and otherwise. Certain variants have an outside diameter of greater than or equal to about 43 mm and/or less than or equal to about 65 mm.

In certain implementations, a smaller diameter can be beneficial, such as when the cartridge 300 is configured to be pressurized (e.g., by sealing the first and/or second end 318, 320). As the diameter decreases, the circumference decreases, which in turn yields a smaller area to be sealed. A smaller sealing area can reduce the amount of force that is needed to provide a desired amount of pressure on the sealing area, such as at least about 2 psi and/or less than or equal to about 40 psi. In some embodiments, the cartridge 300 is configured to be sealed with force of between about 5 pounds and about 50 pounds, between about 15 pounds and about 25 pounds, or otherwise. In some variants, embodiments of the cartridge 300 containing grounds for espresso have a smaller diameter than embodiments of the cartridge 300 containing grounds for brewed coffee.

In various embodiments, the second aperture 321 of the cartridge 300 has a diameter that is less than the outside diameter of the cartridge 300. For example, some implementations have a second aperture 321 with a diameter that is greater than or equal to about 20 mm and/or less than or equal to about 50 mm. In some implementations, the sidewall 310 has a thickness of at least about 0.4 mm and/or less than or equal to about 0.7 mm. Certain embodiments have a sidewall 310 with a thickness of about 0.5 mm. Certain embodiments have a generally uniform thickness of the sidewall 310. Other embodiments have a non-uniform thickness of the sidewall 310. Some embodiments of the cartridge 300 are configured to withstand (e.g., contain) a pressure in the cartridge 300 of at least about: 6 bar, 7 bar, 8 bar, 9 bar, 10 bar, 11 bar, 12 bar, values between the aforementioned values, and otherwise. For example, some embodiments are configured to produce espresso at a pressure of at least about 9 bar. Certain embodiments of the cartridge 300 are configured to produce brewed coffee at a pressure of less than or equal to about 5 psi. In some implementations, the body portion 310 of the cartridge 300 is configured to withstand (e.g., remain substantially rigid) a temperature of at least about 202° Fahrenheit for at least about two minutes. Some variants are configured to withstand a temperature of at least about 208° Fahrenheit for at least about 90 seconds.

As discussed above, certain embodiments have a first filter engagement member 324, which can extend radially outward. In some implementations, the first filter engagement member 324 extends outward of the sidewall 310 by at least about 2 mm (e.g., 3 mm, 4 mm, 5 mm, or otherwise). In some implementations, the first filter engagement member 324 has a thickness of at least about 0.5 mm. Certain variants of the first and/or second filter engagement member 324, 326 extend substantially perpendicular to the axial axis A. In some embodiments, the first filter engagement member 324 extends radially outward from the sidewall 310 a greater amount than the second filter engagement member 326 extends radially inward from the sidewall 310. For example, in certain variants, the first filter engagement member 324 can extend radially outward at least about 3 mm and the second filter engagement member 326 can extend radially inward less than or equal to about 2 mm.

In various embodiments, some or all of the cartridge 300 is formed of a biodegradable and/or compostable material. The term "biodegradable" as used herein shall be given its ordinary and customary meaning, and shall include, without limitation, substances and objects that are capable of being decomposed or otherwise broken-down into innocuous products by the action of living things, such as bacteria, within a reasonable period of time. The term "compostable" as used herein shall be given its ordinary and customary meaning, and shall include, without limitation, substances and objects that are configured to biodegrade in a compost site (e.g., an aerobic composting facility). Articles that are compostable can be biodegradable, and articles that are biodegradable can be compostable. In certain implementations, at least one of the body portion 310, the first filter element 312, and the second filter element 314 is made of a biopolymer, such as polylactic acid (PLA), polyglyconic acid, zein, and poly-3-hydroxybutyrate. Some embodiments comprise CD50122M (commercially available from Ahlstrom Corporation of Helsinki, Finland) and/or DaniMer 15120 (commercially available from DaniMer Scientific, LLC of Bainbridge, Ga., U.S.A.). In certain implementations, at least one of the body portion 310, the first filter element 312, and the second filter element 314 is made of cellulose. In some embodiments, the body portion 310 is made of a molded fiber, such as paper pulp. Some variants of the first filter element 312 and/or the second filter element 314 are made of filter paper. In certain implementations, at least one of the first filter element 312 and the second filter element 314 has a sealing layer of PLA. In certain implementations, substantially the entire cartridge 300 is constructed of PLA. In some variants, the body portion 310 includes a laminate layer (e.g., for sealing). Certain embodiments include recycled and/or reclaimed material, such as post-consumer recycled paper products. Some embodiments are configured to comply with certain compostability standards, such as ASTM6400 and/or EN3432.

Various methods of forming the cartridge 300 are contemplated. For example, in some embodiments, at least the body portion 310 of the cartridge 300 is formed by a molding process, such as injection molding. In some variants, the body portion 310 is formed by thermoforming or otherwise. In some embodiments, at least one of the first and second filter elements 312, 314 are joined with the body portion 310 in the mold. In certain embodiments, some of the body portion 310 flows (e.g., while in a heated state) through a portion of the at least one of the first and second filter elements 312, 314.

As noted above, the cartridge 300 can be configured to contain a volume (e.g., a single serving or single-serve portion) of a beverage component or precursor. For example, some implementations are configured to contain at least about 14 grams of beverage component or precursor. The beverage component or precursor can be most any substance that produces a beverage by mixing the component or precursor with a liquid, such as water or milk. For example, the cartridge 300 can contain coffee grounds, instant coffee, microground coffee, leaves or herbs or other organic material (e.g., for making tea), fruit juice concentrate, soft drink syrup, or otherwise. The term "instant" as used herein shall be given its ordinary and customary meaning, and shall include, without limitation, products that readily dissolve or disperse in a liquid, such as water or milk. In some implementations, the beverage component or precursor comprises coffee grounds (e.g., for brewed coffee) with a median grind size of between about 400 microns and about 900 microns, about 500 microns and about 850 microns, about 700 microns and about 800 microns, or otherwise. In some implementations, the beverage component or precursor comprises coffee grounds (e.g., for espresso) with a median grind size of between about 25 microns and about 500 microns, about 35 microns and about 200 microns, about 40 microns and about 70 microns, or otherwise. Certain embodiments include coffee grounds with a median grind of less than or equal to about 390 microns.

Some embodiments of the cartridge include a plurality of grind sizes. Certain embodiments include primarily two grind sizes (called a bi-modal grind). For example, some embodiments include a ratio (e.g., by weight) of larger grind to smaller grind of about: 90%:10%, 70%:30%, 60%:40%, 50%:50%, 40%:60%, 30%:70%, 90%:10%, ratios between the aforementioned ratios, and otherwise. In some embodiments, the larger grind is at least about 300 microns and/or less than or equal to about 600 microns, such as about 390 microns. In certain variants, the smaller grind is at least about 25 microns and/or less than or equal to about 100 microns, such as about 50 microns. According to some implementations, the size of the smaller grind is about $\frac{1}{15}$th, about $\frac{1}{10}$th, about $\frac{1}{8}$th, about $\frac{1}{6}$th, about $\frac{1}{4}$th, about $\frac{1}{2}$, values in between, or otherwise, of the larger grind. In various implementations, the smaller grinds can fill voids between larger grinds, thereby providing a denser and/or more stable mass, which can be beneficial when compacting the grinds and/or in pressuring the grinds during beverage preparation. Thus, embodiments of the cartridge 300 with the plurality of grind sizes, such as embodiments having a bi-modal grind, can be particularly well suited for producing espresso beverages, which may involve tamping (as discussed above).

In some embodiments, the beverage component or precursor in the cartridge 300 includes microground or pulverized coffee, such as described in U.S. Pat. No. 8,043,645, filed Jul. 9, 2008, U.S. Patent Application Publication No. 2011/0135802, filed Dec. 22, 2010, and U.S. Patent Application Publication No. 2012/0070542, filed Sep. 14, 2011, the entirety of each which is incorporated herein by reference. For example, in some variants, the beverage component or precursor includes coffee having a median particle size of about 350 microns or less. In some embodiments, the beverage component or precursor includes a combination of dry coffee extract and microground coffee. In certain embodiments, the beverage component or precursor includes freeze-dried coffee. In some embodiments, the beverage component or precursor includes a combination of freeze-dried coffee and microground coffee. In certain instances, the beverage component or precursor includes particulate matter, such as particulates of microground coffee.

The type and amount of beverage component or precursor can be selected to provide a beverage having certain desired characteristics. For example, the amount of beverage component or precursor can be selected to deliver a predetermined strength of beverage. In some embodiments, the beverage component or precursor can include dairy, soy, sugar, artificial sweeteners, nutrients, flavorings, or other soluble components, in addition to, for example, coffee or tea.

The beverage component or precursor can be provided in the cartridge 300 in many forms. In some embodiments, the beverage component or precursor is a powder. In certain instances, the beverage component or precursor is granular. In some embodiments, the beverage component or precursor is a slurry or syrup, which is intended to be dissolved, dispersed, and/or diluted by the addition of liquid to produce the beverage.

Various embodiments of the cartridge 300 can be packaged to provide protection, preserve freshness of the beverage component or precursor, and/or inhibit contamination. For example, some embodiments of the cartridge 300 are packaged in a sealed container, such as a box, bag, or pouch. In certain variants, each cartridge 300 is individually packaged, such as in a sealed pouch. In several embodiments, the packaging is biodegradable and/or compostable.

In some implementations, at least one of the filter elements 312, 314 is sealed with a removable membrane, which can be biodegradable and/or compostable. For example, the membrane can be sealed to and/or over the first filter element 312 (e.g., with an adhesive), such that the membrane generally protects the first filter element 312 and can be removed (e.g., by peeling) prior to use of the cartridge 300. Some embodiments include a first removable membrane sealing the first filter element 312 and a second removable membrane sealing the second filter element 314. In some implementations, the membranes provide protection, preserve freshness of the beverage component or precursor, and/or inhibit contamination.

With reference to FIGS. 4A-4F, another illustrative embodiment of a single serve beverage capsule is shown. The capsule 400 resembles or is identical to the cartridge 300 discussed above in many respects. Accordingly, numerals used to identify features of the capsule 400 are incremented by a factor of one hundred (100) to identify like features of the capsule 400. This numbering convention generally applies to the remainder of the figures. Any component or step disclosed in any embodiment in this specification can be used in other embodiments.

As illustrated, the cartridge 400 can include a body portion 410, first filter member 412, and second filter member 414. The body portion 410 can include a sidewall 416. The first filter member 412 can be joined with a first filter engagement member 424, and a second filter member 414 can be joined with a second filter engagement member 426. The cartridge 400 can include a chamber 422 configured to contain the beverage component or precursor.

According to certain embodiments, the body portion 410 includes mating engagement features 432, such as ribs or shoulders. Such mating engagement features 432 can facilitate stacking and/or nesting of several cartridges 400, one partially inside the other. In some implementations, the mating engagement features 432 are configured to inhibit or prevent compression of the beverage component or precursor during stacking of the cartridges 400. As shown, some implementations include a plurality of the mating engagement features 432. Some variants of the mating engagement features 432 are generally equally spaced around a circumference of the cartridge 400. For example, in an embodiment with four mating engagement features 432, the mating engagement features 432 can be circumferentially spaced apart by about 90°. Certain embodiments of the mating engagement features 432 are curved or tapered (e.g., at least about 2°). According to some variants, the mating engagement features 432 are formed with the remainder of the body portion 410, such as during an injection molding operation. In certain implementations, the mating engagement features 432 are formed separately from the remainder of the body portion 410 and subsequently joined with the body portion 410, such as by thermal bonding or adhesive.

FIGS. 5A-5F illustrate another embodiment of a single-serve beverage cartridge 500. In many respects, the beverage cartridge 500 includes elements that are similar or identical to the elements of the beverage cartridges 300, 400 described above, such as a body portion 510, first filter member 512, and second filter member 514. In some embodiments, the body portion 510 includes a sidewall 516. The first filter member 512 can be joined with a first filter engagement member 524, and a second filter member 514 can be joined with a second filter engagement member 526. The cartridge 500 can include a chamber 522 configured to contain the beverage component or precursor. As shown, the cartridge 500 can include a network of struts 532.

Figure 6:
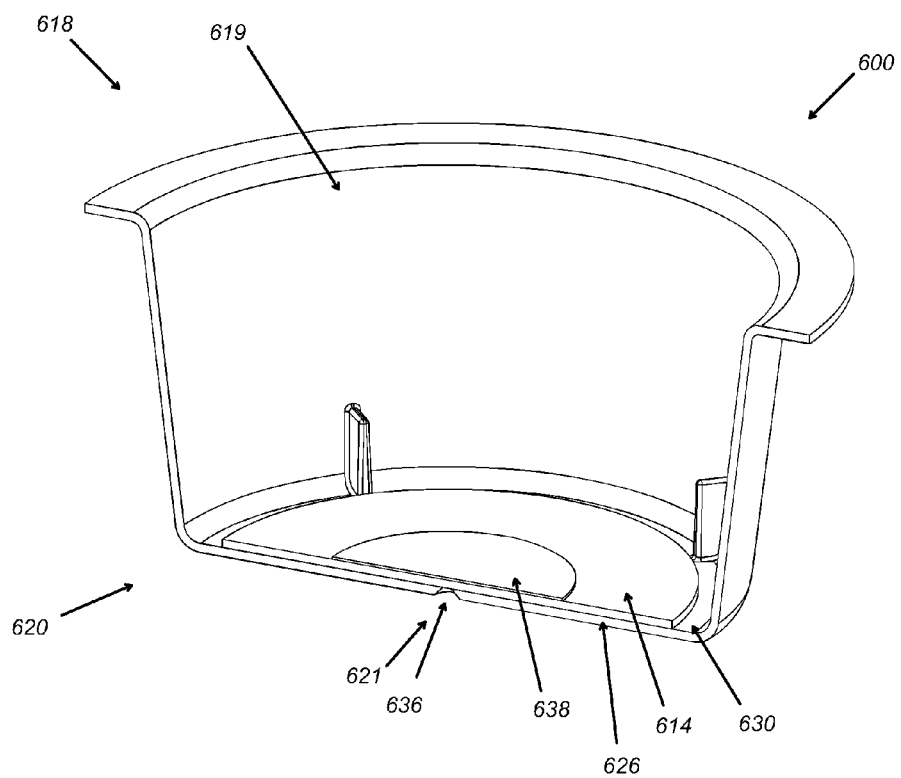
FIG. 6 illustrates a perspective cross-sectional view of another embodiment of a cartridge.

With reference to FIG. 6, another embodiment of a single serve beverage capsule 600 is illustrated. The capsule 600 resembles or is identical to the cartridges 300-500 discussed above in many respects. For example, the capsule 600 includes a body portion 610, a first end 618 with a first aperture 619, and a second end 620 with a second aperture 621. In some embodiments, the first aperture 619 is covered with a first filter element (not shown). In some variants, the second aperture 621 is covered with a second filter element 614.

In some embodiments, the second aperture 621 comprises a restricting orifice 636. Certain variants of the restricting orifice 636 are configured to restrict, hamper, or otherwise limit the discharge of liquid through the second end 620 of the cartridge 600. In some embodiments, limiting the discharge of liquid from the cartridge 600 can facilitate creating a pressure increase inside the cartridge 600, which can aid in the production of certain beverages (e.g., espresso) and/or can aid in compensating for certain inconsistencies in the beverage component or precursor (e.g., due to variations in the grind, tamping, settling or disruption during shipping, or otherwise). Some implementations of the restricting orifice 636 are configured to provide, and/or to facilitate the creation of, at least about 9 bar of pressure in the cartridge 600.

As illustrated, the restricting orifice 636 can be substantially smaller (e.g., in diameter) than the first aperture 619 and/or the second end 620. For example, the ratio of the diameter of the restricting orifice 636 compared to the diameter of the second end 620 can be at least about: 1:5, 1:10, 1:15, 1:20, 1:25, 1:30, 1:40, ratios between the aforementioned ratios, or otherwise. As shown, some implementations include a single restricting orifice 636. Some other variants include a plurality of restricting orifices 636. According to some embodiments, the restricting orifice 636 is positioned in the generally radial center of the cartridge 600. In certain embodiments, the restricting orifice 636 is positioned off-center. In some embodiments, the restricting orifice 636 is generally conical or nozzle-shaped. In certain such variants, a reduced-size portion (e.g., the throat) of the generally conical or nozzle-shaped restricting orifice 636 is generally abutted with the second filter element 614. In various embodiments, the restricting orifice 636 is readily made in the cartridge 600, such as during a molding operation or with a punch. In various embodiments, the restricting orifice 636 has no moving parts.

Some embodiments of the cartridge 600 include a baffle 638, such as a disk of metal foil, plastic, or otherwise. The baffle 638 can be configured to restrict or divert the flow of liquid discharged through the second filter element 614, such as after the liquid has mixed with the beverage component or precursor inside the cartridge 600 to produce an extracted beverage. For example, in some implementations the baffle 638 is made of a generally liquid impermeable material and includes perforations, holes, grooves, channels, or otherwise to permit the liquid to flow therethrough. In some variants, the baffle 638 is configured to direct the extracted beverage to flow around the baffle 638. For example, the baffle 638 can be configured to encourage the extracted beverage to flow generally around the sides of the baffle 638 and/or under the baffle 638 (e.g., between the baffle 638 and an inside surface 630 of a second filter engagement member 626). In some embodiments, the flow is forced to go around the baffle 638 and travel generally horizontally through the second filter element 614 to reach the restricting orifice 636.

In some implementations, the baffle 638 can inhibit localized flow vortices and/or facilitate a pressure increase in the cartridge 600. For example, the baffle 638 can be configured to facilitate the creation of at least about 9 bar of pressure in the cartridge 600, which can be beneficial in the production of some beverages, such as espresso. In some implementations, the baffle 638 can be configured to facilitate the creation of less than or equal to about 5 psi of pressure in the cartridge 600, such as during the production of brewed coffee. In some embodiments, the baffle 638 is generally held in position (e.g., on or relative to the second filter element 614) by teeth or serrations at the edge, by adhesive, or otherwise. In certain variants, the baffle 638 is thinner than the second filter element 614 and/or the second filter engagement member 626.

Some implementations of the cartridge 600, and/or of a single-serve beverage machine configured to accept the cartridge 600, include additional or other pressure facilitating features. For example, some embodiments of the cartridge 600 include a valve (e.g., a flap or duckbill valve) that can be opened, closed, or modulated to generate pressure in the cartridge 600. In some embodiments, a valve that is part of the single-serve beverage machine, and is positioned downstream from the cartridge 600, is configured to generate the pressure in the cartridge 600. Certain embodiments of the valve can be actively adjusted, such as based on liquid flow rate, pressure in the cartridge or brew system, or otherwise. Some variants of the valve comprise a spring-loaded valve that opens and closes, or adjusts, as the pressure in the cartridge increases and decreases. In various embodiments, the valve can be opened for cleaning, rinsing, flushing, and/or to increase the flow rate out of the cartridge 600 and/or through the single-serve beverage machine.

Figure 7:
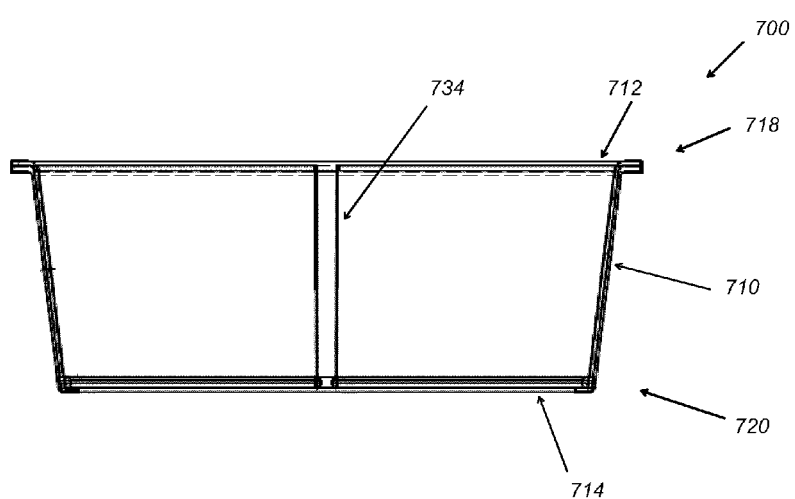
FIG. 7 illustrates a cross-sectional view of another embodiment of a cartridge.

FIG. 7 illustrates another embodiment of a single serve beverage capsule 700, which resembles or is identical to the cartridges 300-600 discussed above in many respects. For example, the capsule 700 can include a body portion 710, first end 718, second end 720, first filter element 712, and second filter element 714. In some embodiments, the cartridge 700 includes one or more support members 734, such as braces or struts. Certain variants of the support member 734 are connected with the body portion 710, so as to provide strength and/or rigidity to the body portion 710. In some implementations, the support member 734 extends generally radially, such as with one or more radially emanating struts (e.g., disposed across at least one of the ends 718, 720). In certain implementations, the support member 734 extends generally circumferentially, such as with one or more annular features. Some variants have a support member 734 that extends generally axially.

Certain implementations of the support member 734 include a network of struts that form a basket, frame, and/or or skeleton. In some embodiments, the basket, frame, and/or or skeleton is received in the body portion 710. In certain variants, the body portion 710 is received in the basket, frame, and/or or skeleton. In some embodiments, the support member 734 comprises an annular structure configured to receive, or to be received in, the body portion 710.

In certain implementations, the support member 734 is engaged with (e.g., molded into) the body portion 710. Such configurations can facilitate bonding and/or sealing between the first and/or second filter members 312, 314 and the body portion 710, can reduce manufacturing variability (e.g., tolerancing), and/or can provide additional features (e.g., such as grooves, dimples, handles, or otherwise). In some embodiments, the support member 734 is engaged with first and/or second filter engagement members of the body portion 710. Certain variants of the support member 734 have one or more annular structures (e.g., engaged with the first and/or second filter engagement members of the body portion 710) and a basket, frame, and/or or skeleton (e.g., engaged with a sidewall of the body portion 710). According to some embodiments, the support member 734 is formed of a different material than the body portion 710. For example, the body portion 710 can be formed of molded fiber or pulp and the support member 734 can be formed of an injection molded compostable resin, such as PLA.

Although certain embodiments have been described herein with respect to coffee, the cartridges described herein can include particulate materials or components for producing many other types of beverages, such as a chocolate based product (e.g., hot cocoa), tea, juice, and other beverages. Further, although some embodiments have been disclosed in which liquid is introduced into the cartridge, the introduction of other phases is contemplated. For example, in some embodiments, steam or a combination of steam and liquid water is introduced into the cartridge. Additionally, although certain embodiments have been disclosed that include a single beverage component or precursor, the term "beverage component or precursor" is not limited to only a single component. Rather, the beverage component or precursor can comprise one component (e.g., coffee) or a plurality of components (e.g., coffee and a sweetener).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although certain embodiments and examples have been described herein, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensible.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The following is claimed:

1. A single-serve beverage cartridge comprising:
a generally hollow body portion comprising a chamber, a sidewall, a first end, and a second end, the first end having a radially outwardly extending lip, the second end having a radially inwardly extending flange;
a beverage component or precursor positioned in the chamber;
a first filter element joined with the lip, the first filter element configured to allow passage of liquid therethrough and to engage with a tamping head of a beverage preparation machine, the first filter element elastically deformable between a first position and a second position, wherein the first filter element is configured such that:
in the first position, the first filter element is positioned outside the chamber of the hollow body portion;
in the second position, the first filter element is recessed within the chamber of the body portion and is engaged with the beverage component or precursor, thereby enabling compressive force from the tamping head to be applied, through the first filter element, to the beverage component or precursor; and
a second filter element joined with the flange and configured to allow passage of liquid therethrough.

2. The cartridge of claim 1, wherein the first filter comprises polylactic acid.

3. The cartridge of claim 1, wherein the first filter element is configured to deform into the second position by stretching.

4. The cartridge of claim 1, wherein the first filter element is configured to deform into the second position by unfolding.

5. The cartridge of claim 1, wherein the first filter element and the second filter element are configured to not be at least one of: separated from the hollow body portion, pierced, or ruptured.

6. The cartridge of claim 1, wherein the cartridge comprises biodegradable materials.

7. The cartridge of claim 1, wherein the body portion and at least one of the first and second filter elements comprise polylactic acid.

8. The cartridge of claim 1, wherein the first filter element is configured to stretch between about 1 mm and about 2 mm along an axial axis of the cartridge.

9. The cartridge of claim 1, further comprising a frame configured to support the body portion.

10. The cartridge of claim 9, wherein the frame comprises a network of struts, the struts coupled with the sidewall.

11. The cartridge of claim 1, wherein at least one of the first and second filter elements comprise a plurality of layers.

12. The cartridge of claim 11, wherein at least one of the first and second filter elements comprise first and second layers with a third layer positioned therebetween.

13. The cartridge of claim 12, wherein the first and second layers comprise woven fibers and the third layer comprises non-woven fibers.

14. The cartridge of claim 1, further comprising a baffle coupled with the second filter element, the baffle configured to direct a flow of liquid around the baffle and through the second filter element.

15. The cartridge of claim 14, wherein the second end comprises a restricting orifice.

16. The cartridge of claim 1, wherein the beverage component or precursor comprises espresso coffee grounds.

* * * * *